United States Patent
LeMay et al.

(10) Patent No.: US 12,504,891 B2
(45) Date of Patent: Dec. 23, 2025

(54) ZERO-REDUNDANCY TAG STORAGE FOR BUCKETED ALLOCATORS

(71) Applicant: Intel Corporation, Santa Clara, CA (US)

(72) Inventors: Michael LeMay, Hillsboro, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 857 days.

(21) Appl. No.: 17/357,951

(22) Filed: Jun. 24, 2021

(65) Prior Publication Data

US 2022/0413715 A1 Dec. 29, 2022

(51) Int. Cl.
*G06F 3/00* (2006.01)
*G06F 3/06* (2006.01)

(52) U.S. Cl.
CPC .......... *G06F 3/0622* (2013.01); *G06F 3/0644* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 4,352,869 A | 10/1982 | Mellors | |
| 4,412,281 A | 10/1983 | Works | |
| 4,415,969 A | 11/1983 | Bayliss et al. | |
| 5,506,073 A | 4/1996 | Angell et al. | |
| 5,714,279 A | 2/1998 | Zajac, Jr. et al. | |
| 6,009,488 A | 12/1999 | Kavipurapu | |
| 6,427,202 B1 | 7/2002 | Richardson et al. | |

(Continued)

FOREIGN PATENT DOCUMENTS

| | | |
|---|---|---|
| CN | 108011883 A | 5/2018 |
| CN | 114942722 A | 8/2022 |

(Continued)

OTHER PUBLICATIONS

LeMay, Michael "BackupRefPtr Spatial Safety Extension," 8 pages, Feb. 2021.

(Continued)

*Primary Examiner* — Midys Rojas
(74) *Attorney, Agent, or Firm* — Nicholson De Vos Webster & Elliott LLP

(57) ABSTRACT

Methods and apparatus relating to zero-redundancy tag storage for bucketed allocators are described. In some embodiments, memory stores a memory page. The memory page includes a metadata page and a plurality of slots. The metadata page includes information corresponding to the plurality of slots. Decode circuitry decodes an instruction that includes a source operand. Execution circuitry executes the decoded instruction according to the source operand to load a first tag for a first slot of the plurality of slots in response to a memory access request directed at the first slot of the plurality of slots. The memory access request is allowed to proceed in response to a match between the first tag and a second tag of a pointer of the memory access request. The memory page stores a separate tag in proximity to each of the plurality of slots. Other embodiments are also disclosed and claimed.

23 Claims, 11 Drawing Sheets

(56) References Cited

U.S. PATENT DOCUMENTS

| | | |
|---|---|---|
| 6,560,693 B1 | 5/2003 | Puzak et al. |
| 6,625,694 B2 | 9/2003 | Masri et al. |
| 6,678,847 B1 | 1/2004 | Perry et al. |
| 6,684,298 B1 | 1/2004 | Dwarkadas et al. |
| 6,687,789 B1 | 2/2004 | Keller et al. |
| 6,766,442 B1 | 7/2004 | Kahle et al. |
| 6,779,036 B1 | 8/2004 | Deshpande |
| 6,826,651 B2 | 11/2004 | Michael et al. |
| 6,947,047 B1 | 9/2005 | Moy et al. |
| 7,017,011 B2 | 3/2006 | Lesmanne et al. |
| 7,096,323 B1 | 8/2006 | Conway et al. |
| 7,178,013 B1 | 2/2007 | Batcher |
| 7,844,053 B2 | 11/2010 | Crispin et al. |
| 8,041,898 B2 | 10/2011 | Moga et al. |
| 8,392,665 B2 | 3/2013 | Moga et al. |
| 8,539,212 B1 | 9/2013 | Kang et al. |
| 9,160,034 B2 | 10/2015 | Kato et al. |
| 9,164,900 B1 | 10/2015 | Schuttenberg |
| 9,172,701 B2 | 10/2015 | Burch et al. |
| 9,519,773 B2 | 12/2016 | Patel et al. |
| 9,940,138 B2 | 4/2018 | Lopez et al. |
| 10,008,735 B2 | 6/2018 | Ohtomo et al. |
| 11,085,964 B2 | 8/2021 | Kurts et al. |
| 11,216,366 B2 | 1/2022 | Durham et al. |
| 12,182,317 B2 * | 12/2024 | LeMay ................. G06F 21/556 |
| 2002/0078331 A1 | 6/2002 | Ju et al. |
| 2002/0103979 A1 | 8/2002 | Koga |
| 2002/0116662 A1 | 8/2002 | Hofstee et al. |
| 2003/0023836 A1 | 1/2003 | Catherwood et al. |
| 2003/0041212 A1 | 2/2003 | Creta et al. |
| 2003/0149865 A1 | 8/2003 | Kadambi |
| 2003/0163649 A1 | 8/2003 | Kapur et al. |
| 2003/0163679 A1 | 8/2003 | Ganapathy et al. |
| 2004/0078558 A1 | 4/2004 | Sprangle |
| 2004/0123043 A1 | 6/2004 | Rotithor et al. |
| 2004/0151986 A1 | 8/2004 | Park et al. |
| 2005/0125640 A1 | 6/2005 | Ford et al. |
| 2005/0198187 A1 | 9/2005 | Tierney et al. |
| 2005/0198479 A1 | 9/2005 | Bean et al. |
| 2006/0101209 A1 | 5/2006 | Lais et al. |
| 2006/0143408 A1 | 6/2006 | Sistla |
| 2006/0179291 A1 | 8/2006 | Di Gregorio |
| 2006/0206686 A1 | 9/2006 | Banerjee et al. |
| 2006/0294344 A1 | 12/2006 | Hsu et al. |
| 2007/0055826 A1 | 3/2007 | Morton et al. |
| 2007/0055958 A1 | 3/2007 | Birenheide et al. |
| 2007/0113059 A1 | 5/2007 | Tran |
| 2007/0233932 A1 | 10/2007 | Collier et al. |
| 2008/0059710 A1 | 3/2008 | Handgen et al. |
| 2008/0162868 A1 | 7/2008 | Glew |
| 2009/0015589 A1 | 1/2009 | Luick et al. |
| 2009/0248989 A1 | 10/2009 | Chicheportiche et al. |
| 2009/0276581 A1 | 11/2009 | Moga et al. |
| 2010/0275049 A1 | 10/2010 | Balakrishnan et al. |
| 2010/0332762 A1 | 12/2010 | Moga et al. |
| 2011/0045355 A1 | 2/2011 | Ichikawa |
| 2011/0055523 A1 | 3/2011 | Kaplan et al. |
| 2011/0283124 A1 | 11/2011 | Branover et al. |
| 2012/0079214 A1 | 3/2012 | Moga et al. |
| 2012/0131555 A1 | 5/2012 | Hossain et al. |
| 2012/0159073 A1 | 6/2012 | Jaleel et al. |
| 2012/0159074 A1 | 6/2012 | Sodhi et al. |
| 2012/0301796 A1 | 11/2012 | Ohtomo et al. |
| 2012/0308900 A1 | 12/2012 | Ogasa |
| 2013/0246709 A1 | 9/2013 | Segelken et al. |
| 2013/0275724 A1 | 10/2013 | Bharadwaj |
| 2013/0295464 A1 | 11/2013 | Yanagi et al. |
| 2014/0195790 A1 | 7/2014 | Merten et al. |
| 2014/0297919 A1 | 10/2014 | Nachimuthu et al. |
| 2015/0127983 A1 | 5/2015 | Trobough et al. |
| 2015/0147659 A1 | 5/2015 | Kato |
| 2015/0254186 A1 | 9/2015 | Sugimoto et al. |
| 2016/0011975 A1 | 1/2016 | Ananthakrishnan et al. |
| 2016/0103232 A1 | 4/2016 | Ouspenski et al. |
| 2016/0149259 A1 | 5/2016 | Osada et al. |
| 2016/0156064 A1 | 6/2016 | Miyashita et al. |
| 2016/0204467 A1 | 7/2016 | Nogami et al. |
| 2016/0248119 A1 | 8/2016 | Kato |
| 2016/0268630 A1 | 9/2016 | Tsukada et al. |
| 2016/0308210 A1 | 10/2016 | Sakuda et al. |
| 2016/0342390 A1 * | 11/2016 | Giesselmann ......... G06F 5/065 |
| 2016/0359193 A1 | 12/2016 | Yi et al. |
| 2017/0024205 A1 | 1/2017 | Kountanis et al. |
| 2017/0040637 A1 | 2/2017 | Ceder et al. |
| 2017/0093567 A1 | 3/2017 | Gopal et al. |
| 2017/0179481 A1 | 6/2017 | Yamada et al. |
| 2017/0187066 A1 | 6/2017 | Tsujimura et al. |
| 2017/0222257 A1 | 8/2017 | Miyashita et al. |
| 2017/0229734 A1 | 8/2017 | Furukawa et al. |
| 2017/0243203 A1 | 8/2017 | Bond et al. |
| 2017/0286254 A1 | 10/2017 | Menon et al. |
| 2017/0288281 A1 | 10/2017 | Chiang et al. |
| 2017/0300418 A1 | 10/2017 | Reed et al. |
| 2017/0344510 A1 | 11/2017 | Park et al. |
| 2017/0353576 A1 | 12/2017 | Guim Bernat et al. |
| 2018/0095752 A1 | 4/2018 | Kudaravalli et al. |
| 2018/0183065 A1 | 6/2018 | Sasaki |
| 2018/0269521 A1 | 9/2018 | Ohtomo et al. |
| 2018/0300238 A1 | 10/2018 | Vembu et al. |
| 2018/0307438 A1 | 10/2018 | Huang et al. |
| 2019/0012267 A1 | 1/2019 | Scalabrino et al. |
| 2019/0042799 A1 | 2/2019 | Durham et al. |
| 2019/0067736 A1 | 2/2019 | Yoshioka et al. |
| 2019/0088995 A1 | 3/2019 | Asano et al. |
| 2019/0095345 A1 | 3/2019 | Zmudzinski et al. |
| 2019/0095389 A1 | 3/2019 | Barnes et al. |
| 2019/0097266 A1 | 3/2019 | Yamamoto et al. |
| 2019/0097818 A1 | 3/2019 | Lu et al. |
| 2019/0220284 A1 | 7/2019 | Gupta et al. |
| 2019/0347213 A1 | 11/2019 | Lutz et al. |
| 2020/0089504 A1 | 3/2020 | Sheikh et al. |
| 2020/0125501 A1 | 4/2020 | Durham et al. |
| 2020/0125770 A1 | 4/2020 | LeMay et al. |
| 2020/0134417 A1 | 4/2020 | Mohapatra et al. |
| 2020/0159676 A1 | 5/2020 | Durham et al. |
| 2020/0169383 A1 | 5/2020 | Durham et al. |
| 2020/0210183 A1 | 7/2020 | Burylov et al. |
| 2020/0212481 A1 | 7/2020 | Nagamine et al. |
| 2020/0228137 A1 | 7/2020 | Chinya et al. |
| 2020/0328454 A1 | 10/2020 | Sakai et al. |
| 2020/0328455 A1 | 10/2020 | Sakai et al. |
| 2020/0328457 A1 | 10/2020 | Sakai et al. |
| 2020/0328460 A1 | 10/2020 | Asano et al. |
| 2020/0328461 A1 | 10/2020 | Asano et al. |
| 2020/0328462 A1 | 10/2020 | Asano et al. |
| 2020/0328464 A1 | 10/2020 | Asano et al. |
| 2020/0328465 A1 | 10/2020 | Sakaida et al. |
| 2020/0328468 A1 | 10/2020 | Sakaida et al. |
| 2020/0328469 A1 | 10/2020 | Asano et al. |
| 2020/0335817 A1 | 10/2020 | Asano et al. |
| 2020/0348361 A1 | 11/2020 | Kurts et al. |
| 2020/0350615 A1 | 11/2020 | Sakaida et al. |
| 2020/0350622 A1 | 11/2020 | Sakaida et al. |
| 2020/0371811 A1 | 11/2020 | Govindan et al. |
| 2020/0379902 A1 | 12/2020 | Durham et al. |
| 2020/0393557 A1 | 12/2020 | Manneschi |
| 2020/0410327 A1 | 12/2020 | Chinya et al. |
| 2021/0004233 A1 | 1/2021 | Kumar et al. |
| 2021/0042617 A1 | 2/2021 | Chinya et al. |
| 2021/0096861 A1 | 4/2021 | Wang et al. |
| 2021/0117197 A1 | 4/2021 | Hsu et al. |
| 2021/0200546 A1 | 7/2021 | LeMay et al. |
| 2021/0326139 A1 | 10/2021 | Gupta et al. |
| 2021/0357222 A1 | 11/2021 | Nair et al. |
| 2021/0364571 A1 | 11/2021 | Kurts et al. |
| 2021/0397454 A1 | 12/2021 | Plotnikov et al. |
| 2022/0058023 A1 * | 2/2022 | Lemay ................... G06F 9/449 |
| 2022/0091852 A1 | 3/2022 | Gupta et al. |
| 2022/0100520 A1 | 3/2022 | Pokam et al. |
| 2022/0206815 A1 | 6/2022 | Wang et al. |
| 2022/0261509 A1 | 8/2022 | LeMay et al. |
| 2022/0343029 A1 | 10/2022 | Sultana et al. |
| 2023/0056699 A1 | 2/2023 | Subramaniam et al. |
| 2023/0091205 A1 | 3/2023 | Moga et al. |

(56) References Cited

U.S. PATENT DOCUMENTS

| | | | |
|---|---|---|---|
| 2023/0195388 | A1 | 6/2023 | Butera et al. |
| 2023/0214325 | A1 | 7/2023 | Shukla et al. |
| 2023/0315473 | A1 | 10/2023 | Azeem et al. |

FOREIGN PATENT DOCUMENTS

| | | | |
|---|---|---|---|
| CN | 115904504 A | | 4/2023 |
| CN | 116266122 A | | 6/2023 |
| CN | 116400960 A | | 7/2023 |
| EP | 0354774 A2 | | 2/1990 |
| EP | 0354774 A3 | | 8/1992 |
| EP | 2508985 A1 | | 10/2012 |
| EP | 4044027 A2 | | 8/2022 |
| EP | 4141654 A1 | | 3/2023 |
| EP | 4198717 A1 | | 6/2023 |
| EP | 4209915 A1 | | 7/2023 |
| EP | 4392868 A1 | | 7/2024 |
| GB | 2599006 A | | 3/2022 |
| TW | 202328926 A | | 7/2023 |
| WO | 2012040731 A2 | | 3/2012 |
| WO | 2012040731 A3 | | 6/2012 |
| WO | 2021162792 A1 | | 8/2021 |
| WO | 2022139850 A1 | | 6/2022 |

OTHER PUBLICATIONS

MiraclePtr and *Scan—preventing exploitation of UaF bugs (BlinkOn 13).
Ziad, Mohamed Tarek Ibn, "No-FAT: Architectural Support for Low Overhead Memory Safety Checks," Department of Computer Science, New York, NY, pp. 1-14.
Cheuk Wong, "Analysis of DPA and DEMA Attacks," San Jose State University, Master's Projects, May 2012, 110 pages.
Das et al., "Secure JTAG Implementation Using Schnorr Protocol," Journal of Electronic Testing, vol. 29, No. 2, 2013, 22 pages.
European Examination Report for application No. 22208089.7, issued Jan. 18, 2024, 4 pages.
Resubmission: Spec CPU2006 Platform Settings for Lenovo Systems, downloaded from https://www.spec.org/cpu2006/flags/Lenovo-Platform-Flags-V1.2-SKL-. . . , on Sep. 7, 2021, 3 pages.
Valea Emanuele et al., "Encryption-Based Secure JTAG," 2019 IEEE 22nd International Symposium on Design and Diagnostics of Electronic Circuits and Systems (DDECS), IEEE, Apr. 24, 2019.
Extended European Search Report, issued by the European Patent Office on Oct. 19, 2022, 16 bages.
Dixit et al., "silent data corruptions at scale," arXiv:2102.11245v1, Feb. 22, 2021, 8 pages.
Google translation of CN108011883A (May 8, 2018 Publication of CN108011883A, 8 pages) (Year: 2018).
Hochschild et al., "Cores that don't count," In Proceedings of the Workshop on Hot Topics in Operating Systems (pp. 9-16), 8 pages total, Jun. 2021.
IONA Technologies PLC, "iPortal Application Server Developer's Guide," Internet Citation, Oct. 1, 2001, retrieved from: http://www.iona.com/support/docs/iportal_application_server/3.0/DevelopGuide/pdf/ipas30_developguide.pdf.
Luiz Barroso et al., "Attack of the Killer Microseconds," downloaded on Sep. 21, 2022, from [https://cacm.acm.org/magazines/2017/4/215032-attack-of-the-killer-microseconds/fulltext], 8 pages.
Rosenfeld et al., "Attacks and Defenses for JTAG," Politechnic Institute of New York University, Jan./Feb. 2010, 12 pages.
Valea et al., "Encryption-Based Secure JTAG," 2019, Montpelier, France, Univ. Grenoble, 6 pages.
U.S. Appl. No. 17/953,486, filed Sep. 27, 2022, Andreas Kleen.
U.S. Appl. No. 17/958,071, filed Sep. 30, 2022, Tsvika Kurts.
Alves et al., "Early Address Prediction: Efficient Pipeline Prefetch and Reuse," ACM Transactions on Architecture and Code Optimization, vol. 18, No. 3, Jun. 8, 2021, 22 pages.
European Search Report for application No. EP 22206883, Jun. 12, 2023, 11 pages.
International Search Report for PCT/US2011/053317, published Mar. 29, 2012, 4 pages.
IBM T. J. Watson Research Center, "IBM T. J. Watson Research Center," downloaded from https://ieeexplore.ieee.org/xpl/tocresult.jsp?isnumber=7175088 on Aug. 24, 2020, 6 pages.
Ioana Burcea et al., "Phantom-BTB: a Virtualized Branch Target Buffer Design," ASPLOS'09, Mar. 7-11, 2009, 11 pages.
James Bonanno et al., "Two Level Bulk Preload Branch Prediction," IEEE 978-1-4673-5587-2/13, 2013, 12 pages.
Narasimha Adiga et al, "The IBM z15 High Frequency Mainframe Branch Predictor," ACM/IEEE 4Tthe International Symposium on Computer Architecture (ISCA), 2020, 13 pages.
Rakesh Kumar et al. "Blasting Through The Front-End Bottleneck With Shotgun," ASPLOS'18, Mar. 24-28, 2018, 13 pages.
B. Sinharoy et al. "IBM Power8 processor core microarchitecture," IBM J. Res. & Dev. vol. 59 No. 1 Paper 2 Jan./Feb. 2015, 21 pages.
C.-L. K. Shum et al., "Design and microarchitecture of the IBM System z10 microprocessor," IBM J. Res. & Dev. vol. 53 No. 1 Paper 1 2009, 12 pages.
Chromium Blog: Efficient and Safe Allocations Everywhere!, downloaded from "https://blog.chromium.org/2021/04/efficient-and-safe-allocations-everyw," on Jun. 22, 2021, 6 pages.
European Search Report for European Patent Application No. 22 183 309.8, issued Dec. 23, 2022, 11 pages.
International Search Report (PCT/US2022/037037), issued Oct. 27, 2022, 4 pages.
Shuwen Deng et al., "Leaky Frontends: Micro-Op Cache and Processor Frontend Vulnerabilities," arXiv:2105.12224v1. May 25, 2021, pp. 1-13. [See, e.g., PCT ISR, highlighting pp. 3-4 and figure 1.].
U.S. Appl. No. 17/957,977, filed Sep. 30, 2022, Sudhanshu Shukla.
Farooq, M. Umar, and Lizy K. John. "Store-load-branch (slb) predictor: a compiler assisted branch prediction for data dependent branches." High Performance Computer Architecture (HPCA2013), 2013 IEEE 19th International Symposium on. IEEE, 2013.
Gao, et al. "Address-branch correlation: a novel locality for long latency hard-to-predict branches," High Performance Computer Architecture, HPCA 2008, IEEE 14th International Symposium, Piscataway, New Jersey (Feb. 16, 2008).
GB Examination Report and Notification of Intention to Grant counterpart GB application GB21111963.1, Jun. 28, 2022, 2 pages.
Notice of Allowance from application No. 2028988 filed in NL, issued Jul. 29, 2022, 1 page (including copy of Google machine translation). together with allowed claims in English, 3 pages.
Notice of Grant for counterpart GB application No. GB2599006, issued Sep. 13, 2022, 2 pages.
Notice of Grant from counterpart Dutch patent application under No. under No. 2028988, Jul. 27, 2022, 5 pages [with Google Translation].
Office Action issued on Apr. 4, 2022 for Dutch Patent Application No. 20228988.
U.S. Appl. No. 17/409,090, filed Aug. 23, 2021, Kameswar Subramaniam.
U.S. Appl. No. 17/555,174, filed Dec. 17, 2021, William Butera.
Chen et al, "Using Dataflow to Optimize Energy Efficiency of Deep Neural Network Accelerators," IEEE Micro, IEEE Computer Society, May/Jun. 2017, 10 pages.
Chen et al. "Eyeriss: an Energy-Efficient Reconfigurable Accelerator for Deep Convolutional Neural Networks," in ISSCC 2016, IEEE International Solid-State Circuits Conference, Jan. 31-Feb. 4, 2016, 4 pages.
Written Opinion of the International Searching Authority, issued Oct. 28, 2022, 7 pages.
Final Office Action for U.S. Appl. No. 16/905,914, mailed Feb. 27, 2024, 16 pages.
Non-final Office Action for U.S. Appl. No. 17/357,963, mailed Apr. 9, 2024, 16 pages.
Notice of Allowance issued in U.S. Appl. No. 17/028,387, issued Mar. 27, 2024, 10 pages.
Extended European Search Report for application No. 22208089.7, issued Apr. 28, 2023, 7 pages.

(56) References Cited

OTHER PUBLICATIONS

HPC Cluster Tuning on 3rd Generation Intel Xeon Scalable Processors, Intel Optimization Guide, High Performance Computing Intel Xeon Scalable Processor, 10 pages.

Intel Select Solutions for HPC & AI Converged Clusters [Magpie*], Solution Brief, Intel Select Solutions High Solutions High Performance Computing and AI, May 2019.

Jouppi et al. "In-Datacenter Performance Analysis of a Tensor Processing Unit," 2017 ACM/IEEE 44th Annual International Symposium on Computer Architecture (ISCA), Tornonto, ON, 2017, 12 pages.

M. Al-Otoom, E. Forbes, and E. Rotenberg, "Exact: explicit dynamic branch prediction with active updates," in Proceedings of the 7th ACM international conference on Computing frontiers. ACM, 2010, pp. 165-176.

Sheikh, Rami, James Tuck, and Eric Rotenberg. "Control-flow decoupling." Proceedings of the 2012 45th Annual IEEE/ACM International Symposium on Microarchitecture. IEEE Computer Society, 2012.

Sheikh, Rami, James Tuck, and Eric Rotenberg. "Control-Flow Decoupling: an Approach for Timely, Non-speculative Branching," IEEE Transactions on Computers, Oct. 2014.

Spec CPU2006 Platform Settings for Lenovo Systems, 3 pages.

Sudhanshu Shukla et al., "Register File Prefetching," International Symposium on Computer Architecture (ISCA '22). ACM, NewYork, NY, USA, Jun. 18-22, 2022, published Jun. 11, 2022, 14 pages.

Partial European Search Report, issued Jul. 12, 2022, for Application No. 22150649.6, 15 pages.

Notice of Allowance issued in U.S. Appl. No. 17/409,090, issued Oct. 30, 2024, 10 pages.

Office Action issued in U.S. Appl. No. 17/479,582, mailed on Sep. 30, 2024, 11 pages.

* cited by examiner

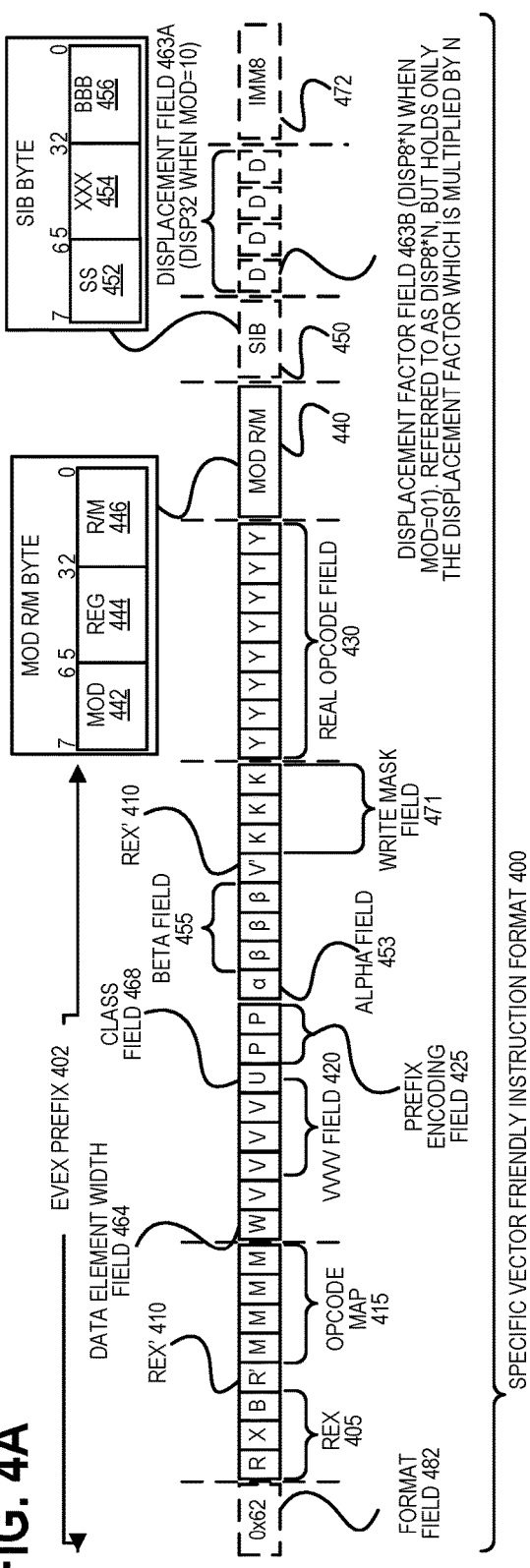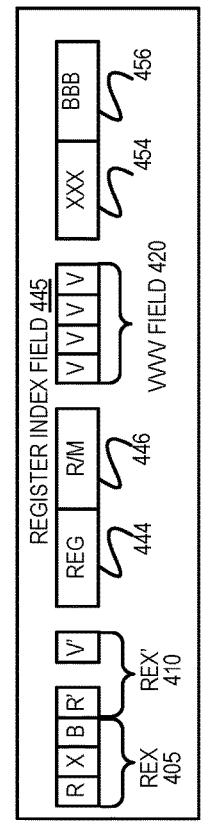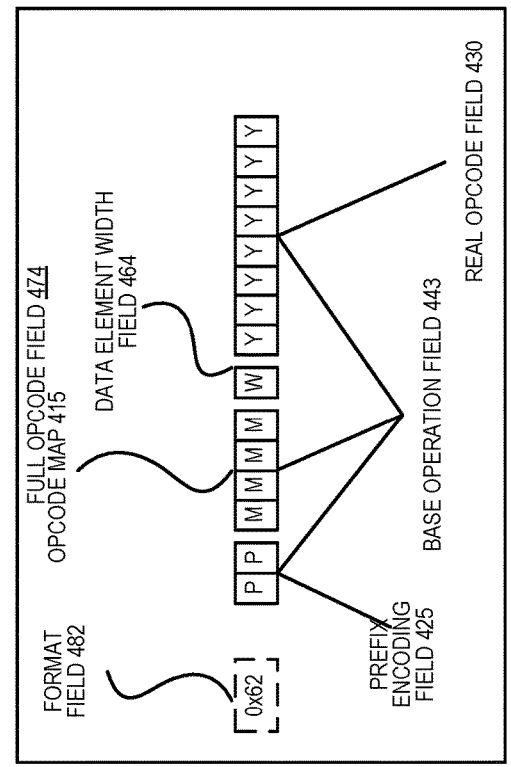

ZERO-REDUNDANCY TAG STORAGE FOR BUCKETED ALLOCATORS

FIELD

The present disclosure generally relates to the field of electronics. More particularly, some embodiments relate to techniques for zero-redundancy tag storage for bucketed allocators.

BACKGROUND

Since software is an integral part of computing and depends on allocated data in memory for its correct and trustworthy functionality, the safety of memory that stores allocations is paramount. Memory safety generally refers to protection from various software security vulnerabilities.

A major portion of software security vulnerabilities can be due to memory safety violations. There are multiple types of violations including, for example, temporal safety violations (e.g., Use-After-Free (UAF)), spatial safety violations (e.g., Out-Of-Bounds (OOB) accesses), type confusion, and buffer overflows.

BRIEF DESCRIPTION OF THE DRAWINGS

So that the manner in which the herein recited features of the present embodiments can be understood in detail, a more particular description of the embodiments may be had by reference to embodiments, some of which are illustrated in the appended drawings. It is to be noted, however, that the appended drawings illustrate only typical embodiments and are therefore not to be considered limiting of their scope.

FIG. 4A is a block diagram illustrating an exemplary instruction format according to embodiments.

FIG. 4B is a block diagram illustrating the fields of the instruction format that make up the full opcode field according to one embodiment.

FIG. 4C is a block diagram illustrating the fields of the instruction format that make up the register index field according to one embodiment.

DETAILED DESCRIPTION

Figure 1:
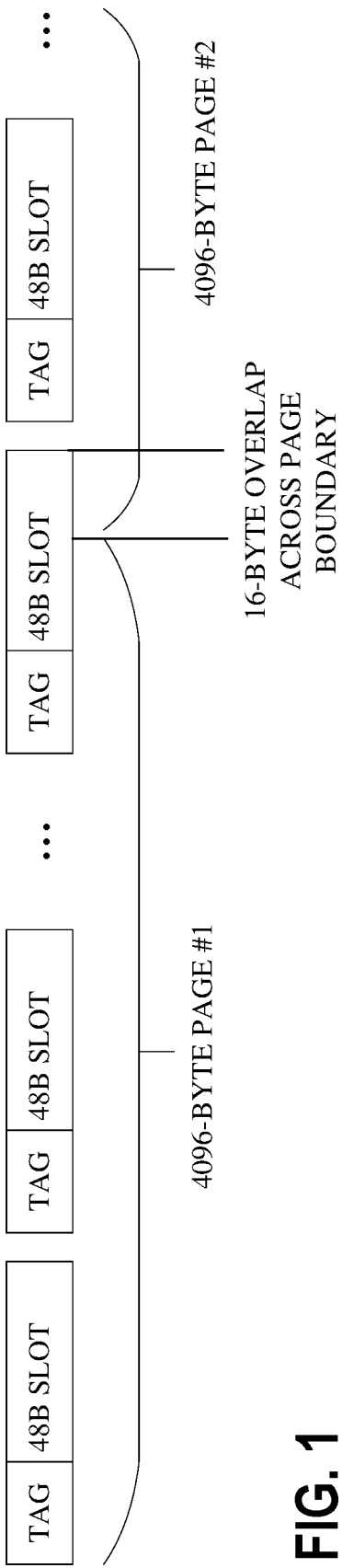
FIG. 1 illustrates a block diagram of a bucketed memory layout, according to an embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

As mentioned above, one major portion of software security vulnerabilities can be due to memory safety violations. There are multiple types of violations including, for example, temporal safety violations (e.g., Use-After-Free (UAF)), spatial safety violations (e.g., Out-Of-Bounds (OOB) accesses), type confusion, and buffer overflows.

For example, memory tagging assigns a tag value to each granule of storage, e.g., 16 bytes, and checks whether a tag value embedded in a pointer matches the tag for every granule of storage that is accessed. Memory tagging may provide a mitigation for buffer overflows and use-after-free (UAF) vulnerabilities that are of high interest. One of the most significant drawbacks of traditional tagging techniques is that they duplicate the tag for every granule of memory, e.g. every 16 bytes. They also traditionally store tags separately from allocations, which may hurt cache and page locality. Hence, such techniques introduce substantial memory overhead, performance overhead, and/or hardware complexity.

To this end, some embodiments provide techniques for zero-redundancy tag storage for bucketed memory allocators. An embodiment places each tag inline just prior to the corresponding allocation (which offers improved locality compared to grouping tags at the beginnings of pages, for example). While some embodiments discuss placing a tag at the beginning or prior to a corresponding allocation, embodiments are not limited to this and the tag may be placed elsewhere such as at the end or after the data in-line, e.g., with or without an offset. At least one embodiment applies to a memory allocator that groups similarly-sized allocations into memory regions (or buckets) with identically-sized allocation slots (where such a memory allocator is sometimes referred to herein as a "bucketed" allocator). This approach may be used to locate metadata such as a tag at the beginning of each slot.

Some embodiments may also store other types of metadata within each slot such as permission bits, a compartment identifier (ID), an error checking code, a cryptographic Message Authentication Code (MAC) or Integrity-Check Value (ICV), key, key ID, tweak, counter, privilege level, identifier for code authorized to access the data such as a hash value, etc. As discussed herein, an "allocation" may interchangeably refer to an "object." In another embodiment, a Linear Inline Metadata (LIM) approach can be applied in a complementary fashion to large, irregular allocations while still covering bucketed allocations. Multiple ranges of memory may exist within a program or kernel with different memory safety mechanisms applied to each. The processor may determine which memory safety mechanism(s) are applicable for each access, e.g., based on range registers, page attributes, or non-address pointer bit values, and invoke all of them to check the access. Some embodiments may encrypt pointers to bucketed allocations, in which case a pointer may be decrypted prior to checking or otherwise operating upon it, and a pointer may be encrypted prior to placing it in a register or memory.

Yet another embodiment adds instruction (or Instruction Set Architecture (ISA)) support to recognize the allocation slot size in each distinct region of memory so that a tag can be stored just before each allocation within its slot. The instruction achieves this via a slot size specifier stored at the beginning of each page and applied to the entire page. For example, a processor/core compares a tag in a pointer to a tag value stored in each allocation slot and only permits the access to proceed if the tags match.

Moreover, memory tagging typically stores a copy of the tag for each granule of data (e.g., 16 bytes) in a linearly or physically mapped table, separate from data in linear or physical memory. Alternatively, tags may be stored in dedicated DRAM (Dynamic Random Access Memory), e.g. ECC (Error Correcting Code) like storage. However, storing tags in tables separate from data hurts locality. Storing tags in dedicated DRAM imposes a fixed memory overhead on all DRAM. Additionally, both approaches may suffer from extra cache overheads. Accordingly, memory tagging is currently of high interest across the computing industry, but existing solutions may consume a lot of memory and introduce high overheads for accessing metadata with poor data locality. Some embodiments address both of those challenges with an approach tailored to modern memory allocators, which will enable those workloads to run more efficiently.

As discussed herein, a memory allocator logic may be implemented in various locations in communication with a memory device. For example, memory allocator logic may be provided as part of one or more computing system components (such as the memory access circuitry 664 and/or memory unit 670 of FIG. 6B, memory controller 742 of FIG. 7, memory controller hub 816 of FIG. 8, memory controller 914 of FIG. 9, memory interface 1014 of FIG. 10, and so on). Alternatively, the memory allocator may be implemented as a software library linked by an application and running atop an operating system.

FIG. 1 illustrates a block diagram of a bucketed memory layout, according to an embodiment. As shown, each page (e.g., 4 kBytes or 4096 Bytes) includes a plurality of similarly sized slots (e.g., 48 Bytes each) in each memory region. Metadata such as a tag is stored at the beginning of each slot. While some embodiments are discussed herein with reference to a specific size, embodiments are not limited to such specific sizes and other sizes may be used depending on the implementation.

In an embodiment, the processor needs to be informed of what slot sizes are in use in certain memory regions and where each region begins to be able to compute the boundaries for all slots within the region. As illustrated in FIG. 1, slots may cross page boundaries, so the beginning of each page does not necessarily align with the beginning of the first slot on that page. One place to store such information is in the relevant Page Table Entries (PTEs). PTE(s) may be stored in various locations in communication with a memory device, including any of the memory devices discussed herein, e.g., with reference to FIGS. 1-10. However, PTE bits are generally fully utilized, and specifying a wide variety of slot sizes would require a relatively large encoded value. Thus, it would be helpful to find other potential storage locations for that information.

Figure 2:
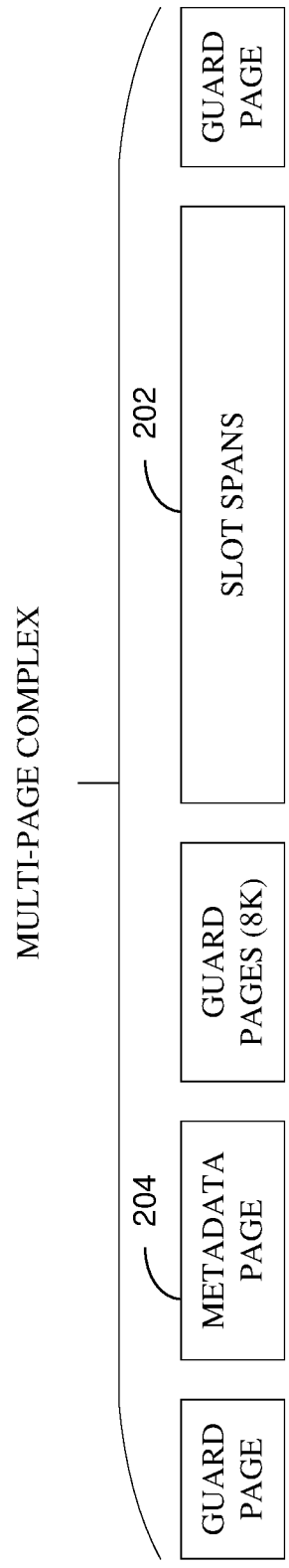
FIG. 2 illustrates a block diagram of a multi-page complex memory layout that may be utilized in one or more embodiments.

Some allocators may place metadata at certain intervals. FIG. 2 illustrates a block diagram of a multi-page complex memory layout that may be utilized in one or more embodiments. For example, some web browser allocators may define 2 MB-aligned multi-page complexes containing multiple slot spans 202 with differing slot sizes as shown in FIG. 2.

The metadata page 204 contains information for each portion of the slot spans. The slot spans may be divided into compound pages, each of which is assigned to a bucket handling slots of a certain size. The slot size may be specified in a per-bucket data structure, e.g., in the metadata page 204. There may be a mechanism for looking up metadata in the metadata page 204 for each slot span, e.g., by defining an array of metadata that is indexed according to the position of each slot span. For example, each slot span may be a fixed size to permit the processor to compute the slot span number based on the offset of a pointer from the beginning of the slot spans 202 by dividing that offset by the fixed slot span size. The metadata for each slot span may include a pointer or index to locate the per-bucket metadata for the bucket that the slot span is assigned to.

The guard pages shown in FIG. 2 (e.g., 8 kByte) may be used to provide isolation between different regions of the multi-page complex, e.g., in case of a buffer overflow. To make this allocator design more amenable for hardware acceleration, the slot size specifier information in the metadata page 204 could be indexed directly based on the address of each compound page relative to the beginning of the slot spans for the containing multi-page complex, along with a specifier of the offset for the first slot on the page in case that slot starts on a previous page and crosses one or more page boundaries. The regular alignment of the multi-page complex structures simplifies hardware logic for looking up the slot size and offset for a compound page, which may then be cached, e.g. in Translation Lookaside Buffers (TLBs). The allocator may then inform the processor which regions of memory contain bucketed allocations.

In various embodiments, there are a variety of ways this information (regarding which regions of memory contain bucketed allocations) could be conveyed to the processor such as: (a) set a "bucketed" bit in page table entries to that effect; (b) configure one or more range registers covering the regions; (c) set a bit in a linearly mapped data structure defining user-controlled page attributes and referenced by a Model Specific Register (MSR); and/or (d) set a bit in the pointer indicating that it references a bucketed allocation. Also, while some techniques discussed herein may "set" a bit, embodiments are not limited to setting bits and such bit(s) may instead be cleared to convey a certain configuration.

If the page tables are used for this purpose, an embodiment defines a (e.g., user mode) instruction UpdatePTE that can update the bucketed bit for a specified page without being permitted to modify any other bit in the page table entry. One embodiment extends that bit to be able to update other bits to enforce a user-controlled security policy without being permitted to compromise the kernel. For example, UpdatePTE may be used to modify the eXecute Disable (XD), Read/Write (R/W), and/or Protection Key (PKEY) fields for user mappings. Any attempt to modify a supervisor or not-present mapping using UpdatePTE may generate an exception, set a flag indicating a disallowed request, or silently drop the request. The kernel may also control or opt-in to permit user mode PTE updates, e.g., via a control register bit, Model-Specific Register (MSR) bit, or Virtual Machine Control Structure (VMCS) field bit.

In some embodiments, the UpdatePTE instruction described above may also be used for efficiently enforcing Write XOR Execute (WAX) policy for JIT (Just In Time) code by setting the XD bit and/or the R/W bit when preparing to write JIT code to a page and reversing those operations when preparing to execute the JIT-ed code.

Figure 3A:
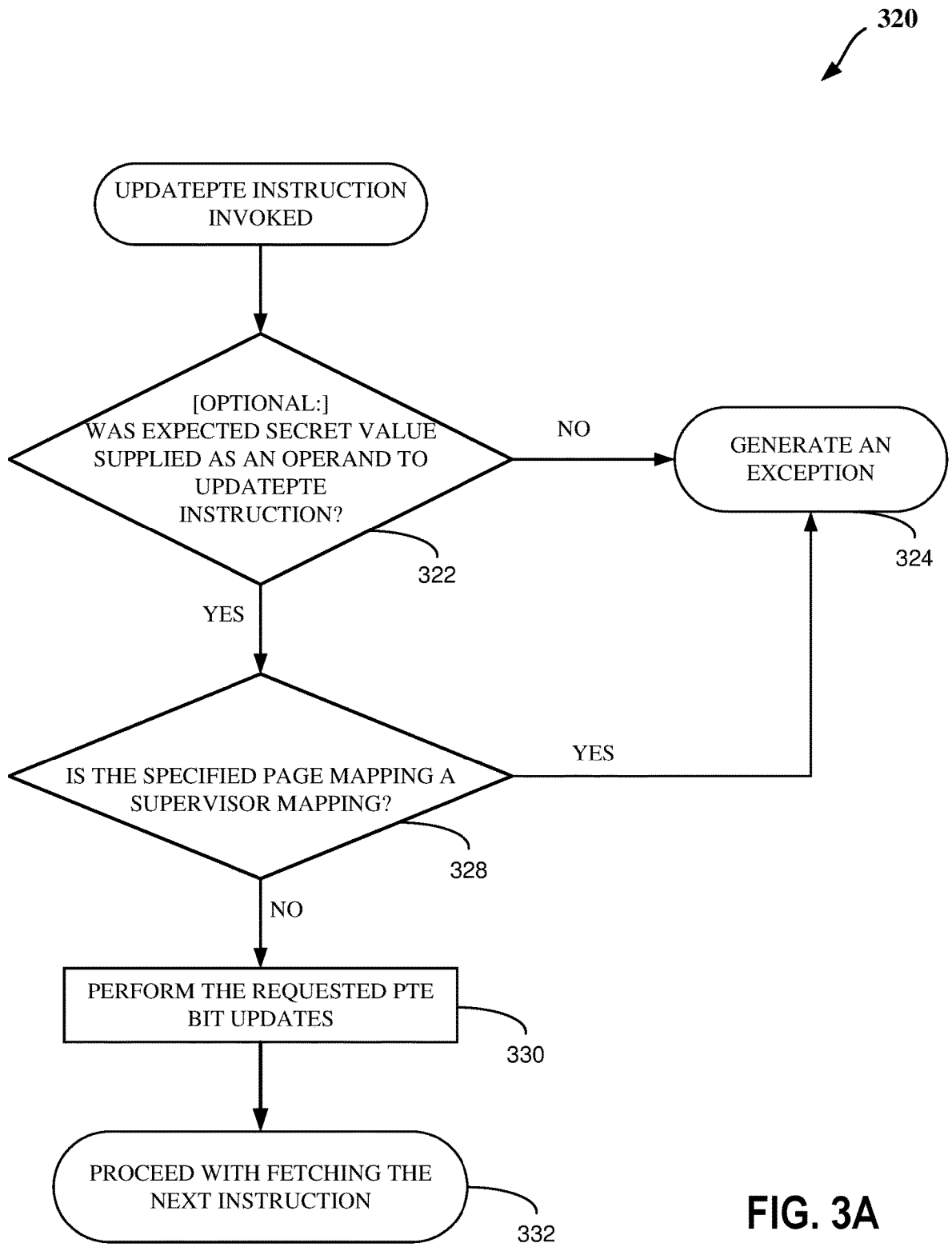
FIG. 3A illustrates a flow diagram of a method to perform one or more operations in response to an instruction, according to an embodiment.

Moreover, FIG. 3A illustrates a flow diagram of a method 320 to perform one or more operations in accordance with the UpdatePTE instruction, according to an embodiment. At an operation 322, UpdatePTE could be predicated upon an expected secret value being provided as an operand to the instruction, e.g. as an immediate operand with UpdatePTE being embedded in execute-only code and Control-Flow Integrity (CFI) being enforced to mitigate adversarial attempts to divulge the secret value by jumping to unintended code offsets. If not, then an exception is generated at operation 324. The secret value would only be installed in instructions that are trusted to update the bits that are modifiable by UpdatePTE. Alternatively, the use of UpdatePTE could be restricted to designated code ranges, e.g. as designated by range registers or PKEY values in page table entries. Certain PKEY values could be marked such that only code pages with those PKEY values would be trusted to use UpdatePTE. For example, the authorized secret value or the authorized PKEY values could be specified in an MSR.

At an operation 328 it is determined whether the specified page mapping is a supervisory mapping and if so, an exception is generated at operation 324. Otherwise, operation 330 performs the requested PTE bit updates and operation 332 proceeds with fetching the next instruction.

An additional instruction may be defined for clearing stale TLB entries after updating PTEs in one embodiment. The old information may still be cached in the TLB entries and any existing instruction may only be executed in supervisory mode. This additional instruction may operate similar to the UpdatePTE instruction in that it could be execute in user mode.

Memory allocator logic may also have the ability to configure the location of the metadata page within a multi-page complex. For example, a user or supervisor MSR could be defined for this purpose. A similar control could be defined to specify the specific starting offset of the slot spans within a multi-page complex.

In some embodiments, the tag metadata may also be stored at an offset from the beginning or end of its slot, and this could be controlled via a separate user or supervisor MSR. In at least one embodiment, placing the tag at the end of the slot can avoid disrupting data alignment, e.g. to minimize added split loads.

Figure 3B:
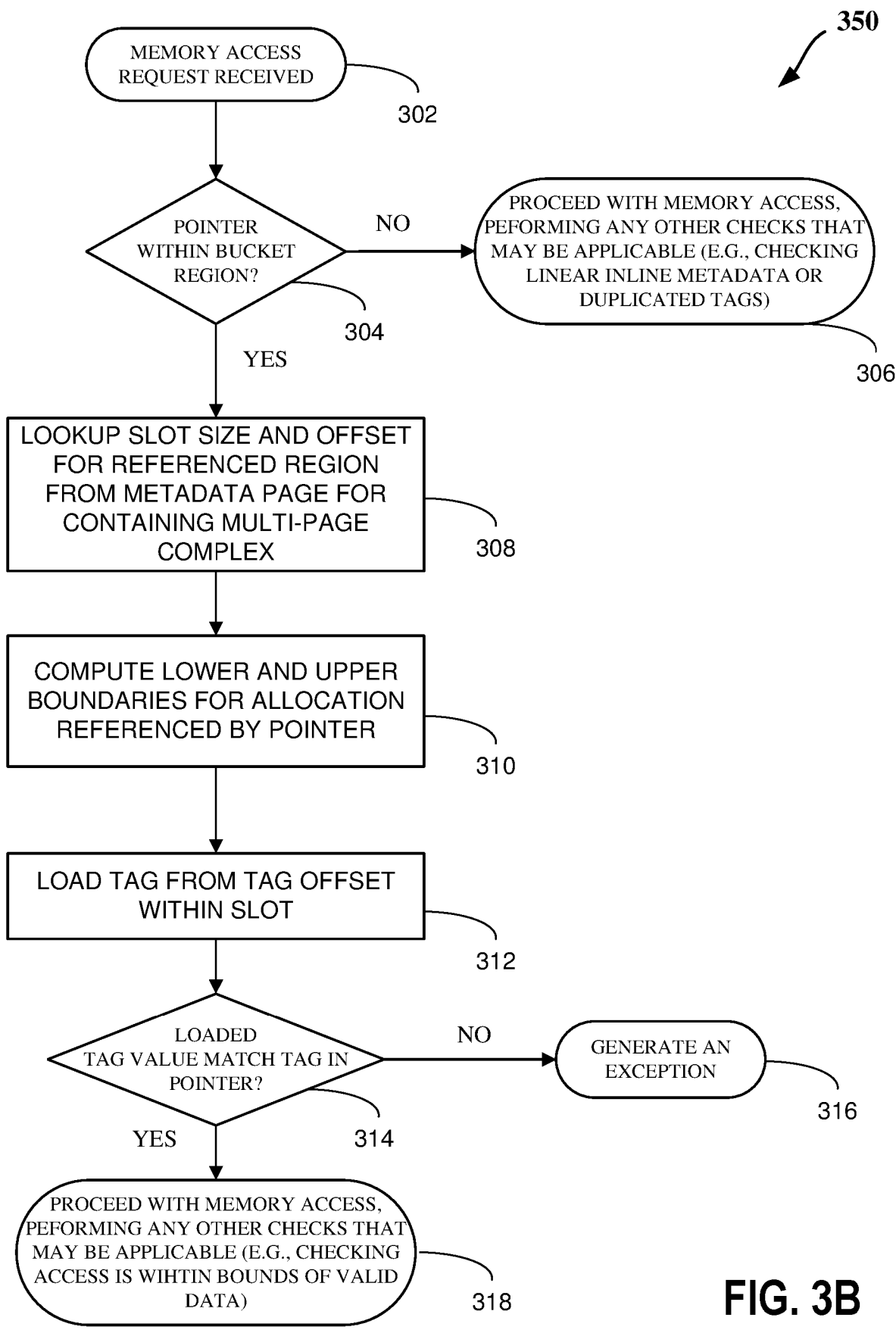
FIG. 3B illustrates a flow diagram of method to process a received memory access request, according to an embodiment.

FIG. 3B illustrates a flow diagram of method 350 to process a received memory access request, according to an embodiment. As further discussed below, one or more operations of method 350 may be performed by a processor (or interchangeably a processor core). Each time a memory access is performed (302), a processor (such as the processors/processor cores discussed with reference to FIGS. 4A-10) may check whether the access pointer of the received memory access request is within a bucketed region (304). If the pointer is not within a bucketed region, operation 306 proceeds with the memory access, and performs any other checks that may be applicable (e.g., checking for linear inline metadata or duplicated tags, etc.). In some embodiments, check 304 may be preceded by a different check that identifies encoded pointers, e.g., for LIM or Cryptographic Computing, to perform the checks for those types of pointers instead of or in addition to the checks for bucketed allocations with non-redundant tags. The checks for encoded pointers may need to come first due to it being infeasible in some embodiments to check whether encoded pointers are within a bucketed region. If the access pointer is within a bucketed region at operation 304, the processor looks up the slot size and offset for the referenced page at operation 308. From this, the processor can compute the lower and upper slot boundaries for the allocation referenced by the pointer at operation 310. At operation 312, the processor may then load the tag from the tag offset in the slot, while at operation 314, the processor compares the loaded tag to the tag in the pointer. At operation 314, if there is a tag mismatch, then the processor generates an exception at operation 316. Otherwise, operation 318 proceeds with the memory access, and performing any other checks that may be applicable (e.g., checking the access is within bounds of valid data, etc.).

The terms "authorized slot" or "authorized allocation slot" are used in the following description, and they refer to the slot containing the allocation to which a pointer's original ancestor pointer refers. A pointer is considered to be a child of another pointer if it was derived from that other pointer, e.g. using a move, add, or subtract operation. The original ancestor pointer is the one returned by the allocator to the program or library that requested the allocation.

In some embodiments, one or more instructions (or ISA extensions) may be defined for setting and accessing tags and other per-allocation metadata. For example, a SetTag and LdTag and UpdatePtr instructions are defined as follows:

(1) SetTag m32/m64, r32

Set the tag associated with the supplied address in the first source operand to the value specified in the second source operand.

Generate an exception if an untagged location is specified, or if that location is checked using duplicated tags, since that location then requires repeated applications of a different instruction to set all copies of the tag.

(2) LdTag r32, m32/m64

Load the tag associated with the supplied address in the source operand into the destination operand.

Generate an exception if an untagged location is specified, or if that location is checked using duplicated tags, since that location then requires a different instruction to be used to load a particular copy of the tag.

(3) UpdatePtr r32/r64, r32/r64, [type/element size]

Determine the authorized slot for the original pointer value, e.g. specified in the first operand. Inspect the poison bit(s), if any, and evaluate the distance of the original pointer value from the nearest slot boundaries to determine the authorized slot for the original pointer. For example, assume that a poison zone is defined, and that it extends in each slot from one less than the type/element size bytes before the end of the data in the slot to the next byte after the data in the slot. If the original pointer is poisoned, this means that it points into the next slot, so the actual slot corresponding to the pointer is the previous slot.

Determine where the pointer will land after being updated, e.g. by adding the value in the second operand to the original pointer value and then checking which zone it lands in as defined for its authorized slot, and respond appropriately:

Within the data region of the authorized slot. In this case, the updated pointer is not poisoned.

Within the poison zone defined relative to the authorized allocation slot. In this case, the updated pointer is poisoned. In an embodiment, poison status can be indicated as a bit in the pointer if a bit is available.

The size of the allocation type or the type of each element within the allocation for array types may be specified in the instruction to be used to determine the extents of poison zones. In that case, the UpdatePtr instruction can check whether a subsequent access using that pointer to some location within a type with the specified size may be out-of-bounds. If so, UpdatePtr will poison the pointer so that bounds checks can be elided in the memory accesses. For example, this may be advantageous if there are many more data accesses than there are pointer updates. In some embodiments, the type/element size may be stored as metadata within the allocation slot and loaded from memory rather than being supplied as an instruction operand. In some embodiments, the type/element size may be specified for the entire page or for a range of pages, e.g., similarly to how slot sizes can be specified.

Within the exclusion zone defined relative to the authorized slot. In this case, an exception is generated, since this is an invalid pointer value. Unless an exception is generated, the UpdatePtr instruction may overwrite the original pointer value in the first operand with the updated pointer value.

Moreover, while the UpdatePtr instruction can be used for the purpose of performing checked pointer arithmetic to check the updated pointer against the bounds of the allocation as detailed above, in another embodiment, the UpdatePtr instruction can also be used to check that the tag in the pointer matches the current tag value for the referenced memory and to generate an exception otherwise. This may lead to faster detection of UAF vulnerabilities compared to waiting until the pointer is dereferenced to check the tag. For example, this may aid debugging of UAF vulnerabilities.

Some embodiments may rely upon a dedicated instruction to perform checks that may otherwise be performed during dereferences. For example, a CheckTagSlotPtrAccess instruction may be defined as follows:

CheckTagSlotPtrAccess m64, r64

The first operand could specify a base memory address for the access.

The second operand could specify a length for the access.

If a dereference to the specified memory range would violate memory safety policy, e.g. due to a tag mismatch or exceeding the bounds of the slot for the allocation, then an exception may be generated.

The CheckTagSlotPtrAccess may implicitly fence usage of the base address register operand in its supplied memory operand to wait for the memory safety checks to complete prior to permitting that base address register operand to be used in a subsequent memory access during transient execution. Alternative embodiments may follow the CheckTagSlotPtrAccess instruction with a distinct fence instruction. In some embodiments, Shared Virtual Memory (SVM) may be used to access an allocation. For example, the checks described above that occur at time of dereference may be applied to that access by a CPU while servicing an Address Translation Services (ATS) translation request. If the access is disallowed, then an ATS translation failure may be indicated. If the pointer is encrypted, then the CPU servicing the ATS request may first decrypt the pointer. Tag updates and pointer updates on the device may be performed using instructions or other device-implemented operations analogous to UpdatePtr. The pointer encryption key may be made available to the device, e.g. via the OS programming an MMIO register, so that the device may update encrypted pointers.

In one or more embodiments, the instruction(s) described herein may accept operands with a variety of orderings and formats not limited to those shown in their example definitions, e.g., memory operands in scaled index+base+displacement format, register operands, immediate operands, etc. In at least some embodiments, one or more of the new instruction(s) may follow the EVEX format (such as discussed with reference to FIGS. 4A-4D).

Additionally, some embodiments may be applied in computing systems that include one or more processors (e.g., where the one or more processors may include one or more processor cores), such as those discussed with reference to FIG. 1 et seq., including for example a desktop computer, a work station, a computer server, a server blade, or a mobile computing device. The mobile computing device may include a smartphone, tablet, UMPC (Ultra-Mobile Personal Computer), laptop computer, Ultrabook™ computing device, wearable devices (such as a smart watch, smart ring, smart bracelet, or smart glasses), etc.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

While embodiments will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

FIG. 4A is a block diagram illustrating an exemplary instruction format according to embodiments. FIG. 4A shows an instruction format 400 that is specific in the sense that it specifies the location, size, interpretation, and order of the fields, as well as values for some of those fields. The instruction format 400 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions.

EVEX Prefix (Bytes 0-3) 402—is encoded in a four-byte form.

Format Field 482 (EVEX Byte 0, bits [7:0])—the first byte (EVEX Byte 0) is the format field 482 and it contains 0x62 (the unique value used for distinguishing the vector friendly instruction format in one embodiment).

The second-fourth bytes (EVEX Bytes 1-3) include a number of bit fields providing specific capability.

REX field 405 (EVEX Byte 1, bits [7-5])—consists of a EVEX.R bit field (EVEX Byte 1, bit [7]—R), EVEX.X bit field (EVEX byte 1, bit [6]—X), and 457BEX byte 1, bit[5]—B). The EVEX.R, EVEX.X, and EVEX.B bit fields provide the same functionality as the corresponding VEX bit fields, and are encoded using is complement form, i.e., ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field QAc10—this is the EVEX.R' bit field (EVEX Byte 1, bit [4]—R') that is used to encode either the upper 16 or lower 16 of the extended 32 register set. In one embodiment, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 415 (EVEX byte 1, bits [3:0]—mmmm)—its content encodes an implied leading opcode byte (0F, 0F 38, or 0F 3).

Data element width field 464 (EVEX byte 2, bit [7]—W)—is represented by the notation EVEX.W. EVEX.W is used to define the granularity (size) of the datatype (either 32-bit data elements or 64-bit data elements). This field is optional in the sense that it is not needed if only one data element width is supported and/or data element widths are supported using some aspect of the opcodes.

EVEX.vvvv 420 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 420 encodes the 4 low-order bits of the first source register specifier stored in inverted (1 s complement) form. Depending on the instruction, an extra different EVEX bit field is used to extend the specifier size to 32 registers.

EVEX.U 468 Class field (EVEX byte 2, bit [2]-U)—If EVEX.U=0, it indicates class A (support merging-write-masking) or EVEX.U0; if EVEX.U=1, it indicates class B (support zeroing and merging-writemasking) or EVEX.U1.

Prefix encoding field 425 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 453 (EVEX byte 3, bit [7]—EH; also known as EVEX.EH, EVEX.rs, EVEX.RL, EVEX.writemask control, and EVEX.N; also illustrated with α)—its content distinguishes which one of the different augmentation operation types are to be performed.

Beta field 455 (EVEX byte 3, bits [6:4]-SSS, also known as EVEX.s2-0, EVEX.r2-0, EVEX.rr1, EVEX.LL0, EVEX.LLB; also illustrated with βββ)—distinguishes which of the operations of a specified type are to be performed.

REX' field 410—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Writemask field 471 (EVEX byte 3, bits [2:0]-kkk)—its content specifies the index of a register in the writemask registers. In one embodiment, the specific value EVEX kkk=000 has a special behavior implying no writemask is used for the particular instruction (this may be implemented in a variety of ways including the use of a writemask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the writemask field 471 allows for partial vector operations, including loads, stores, arithmetic, logical, etc. While embodiments are described in which the writemask field's 471 content selects one of a number of writemask registers that contains the writemask to be used (and thus the writemask field's 471 content indirectly identifies that masking to be performed), alternative embodiments instead or additional allow the mask write field's 471 content to directly specify the masking to be performed.

Real Opcode Field 430 (Byte 4) is also known as the opcode byte. Part of the opcode is specified in this field.

MOD R/M Field 440 (Byte 5) includes MOD field 442, register index field 444, and R/M field 446. The MOD field's 442 content distinguishes between memory access and non-memory access operations. The role of register index field 444 can be summarized to two situations: encoding either the destination register operand or a source register operand, or be treated as an opcode extension and not used to encode any instruction operand. The content of register index field 444, directly or through address generation, specifies the locations of the source and destination operands, be they in registers or in memory. These include a sufficient number of bits to select N registers from a P×Q (e.g., 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

The role of R/M field 446 may include the following: encoding the instruction operand that references a memory address, or encoding either the destination register operand or a source register operand.

Scale, Index, Base (SIB) Byte (Byte 6)—The scale field's 450 content allows for the scaling of the index field's content for memory address generation (e.g., for address generation that uses 2scale*index+base). SIB.xxx 454 and SIB.bbb 456—the contents of these fields have been previously referred to with regard to the register indexes Xxxx and Bbbb.

Displacement field 463A (Bytes 7-10)—when MOD field 442 contains 10, bytes 7-10 are the displacement field 463A, and it works the same as the legacy 32-bit displacement (disp32) and works at byte granularity. This may be used as part of memory address generation (e.g., for address generation that uses 2scale*index+base+displacement).

Displacement factor field 463B (Byte 7)—when MOD field 442 contains 01, byte 7 is the displacement factor field 463B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 463B is a reinterpretation of disp8; when using displacement factor field 463B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 463B substitutes the legacy x86 instruction set 8-bit displacement. Thus, the displacement factor field 463B is encoded the same way as an x86 instruction set 8-bit displacement (so no changes in the Mod RM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 472 allows for the specification of an immediate. This field is optional in the sense that is it not present in an implementation of the generic vector friendly format that does not support immediate and it is not present in instructions that do not use an immediate.

Full Opcode Field

FIG. 4B is a block diagram illustrating the fields of the instruction format 400 that make up the full opcode field 474 according to one embodiment. Specifically, the full opcode field 474 includes the format field 482, the base operation field 443, and the data element width (W) field 463. The base operation field 443 includes the prefix encoding field 425, the opcode map field 415, and the real opcode field 430.

Register Index Field

FIG. 4C is a block diagram illustrating the fields of the format 400 that make up the register index field 445 according to one embodiment. Specifically, the register index field 445 includes the REX field 405, the REX' field 410, the MODR/M.reg field 444, the MODR/M.r/m field 446, the VVVV field 420, xxx field 454, and the bbb field 456.

Augmentation Operation Field

Figure 4D:
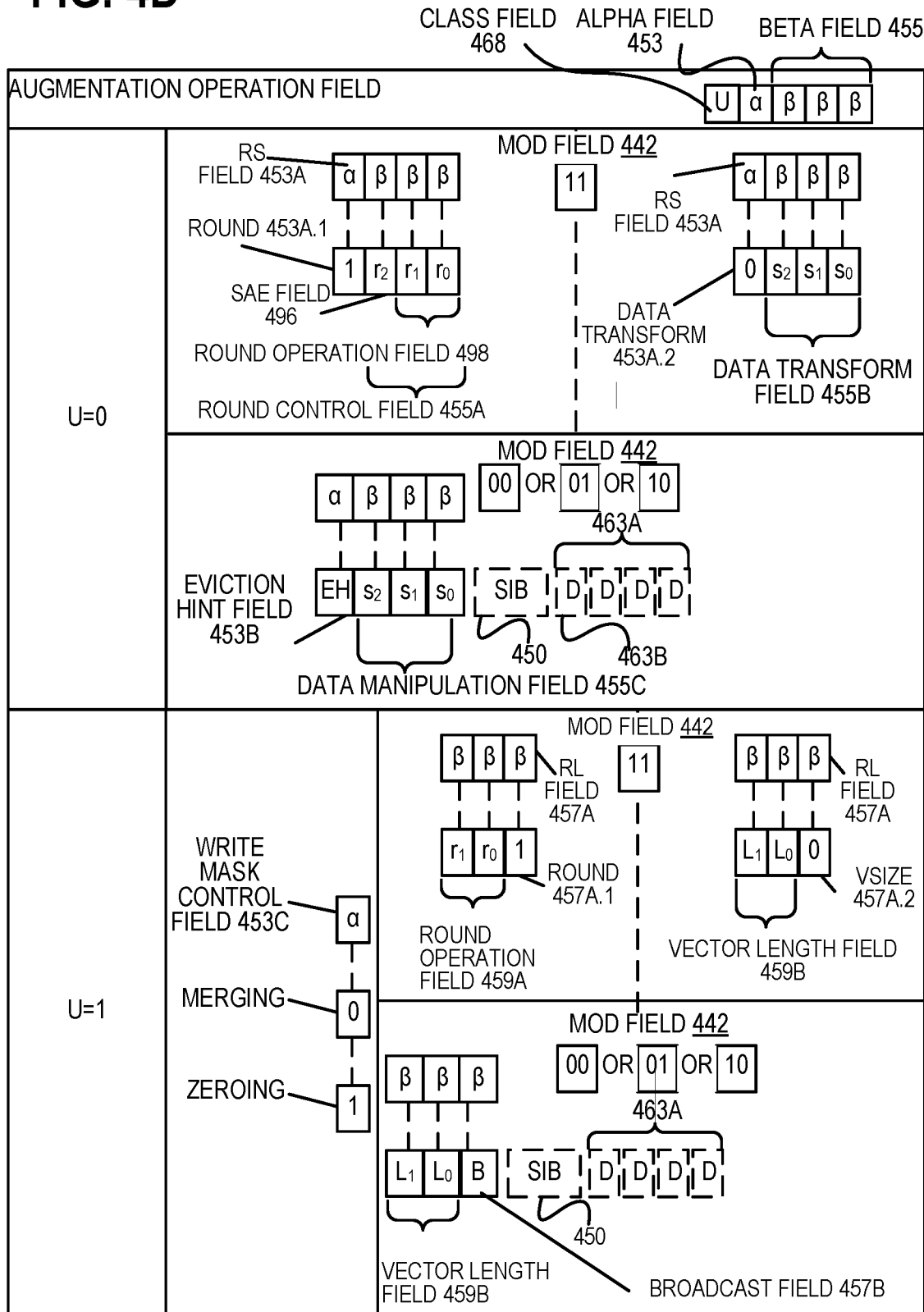
FIG. 4D is a block diagram illustrating the fields of the instruction format that make up the augmentation operation field according to one embodiment.

FIG. 4D is a block diagram illustrating the fields of the instruction format 400 that make up an augmentation operation field according to one embodiment. When the class (U) field 468 contains 0, it signifies EVEX.U0 (class A 468A); when it contains 1, it signifies EVEX.U1 (class B 468B).

When U=0 and the MOD field 442 contains 11 (signifying a no memory access operation), the alpha field 453 (EVEX byte 3, bit [7]—EH) is interpreted as the rs field 453A. When the rs field 453A contains a 1 (round 453A.1), the beta field 455 (EVEX byte 3, bits [6:4]—SSS) is interpreted as the round control field 455A. The round control field 455A includes a one bit SAE field 496 and a two bit round operation field 498. When the rs field 453A contains a 0 (data transform 453A.2), the beta field 455 (EVEX byte 3, bits [6:4]—SSS) is interpreted as a three bit data transform field 455B. When U=0 and the MOD field 442 contains 00, 01, or 10 (signifying a memory access operation), the alpha field 453 (EVEX byte 3, bit [7]—EH) is interpreted as the eviction hint (EH) field 453B and the beta field 455 (EVEX byte 3, bits [6:4]—SSS) is interpreted as a three bit data manipulation field 455C.

When U=1, the alpha field 453 (EVEX byte 3, bit [7]—EH) is interpreted as the writemask control (Z) field 453C. When U=1 and the MOD field 442 contains 11 (signifying a no memory access operation), part of the beta field 455 (EVEX byte 3, bit [4]—S0) is interpreted as the RL field 457A; when it contains a 1 (round 457A.1) the rest of the beta field 455 (EVEX byte 3, bit [6-5]—S2-1) is interpreted as the round operation field 459A, while when the RL field 457A contains a 0 (VSIZE 457.A2) the rest of the beta field 455 (EVEX byte 3, bit [6-5]—S2-1) is interpreted as the vector length field 459B (EVEX byte 3, bit [6-5]—L1-0). When U=1 and the MOD field 442 contains 00, 01, or 10 (signifying a memory access operation), the beta field 455 (EVEX byte 3, bits [6:4]—SSS) is interpreted as the vector length field 459B (EVEX byte 3, bit [6-5]—L1-0) and the broadcast field 457B (EVEX byte 3, bit [4]—B).

Exemplary Register Architecture

Figure 5:
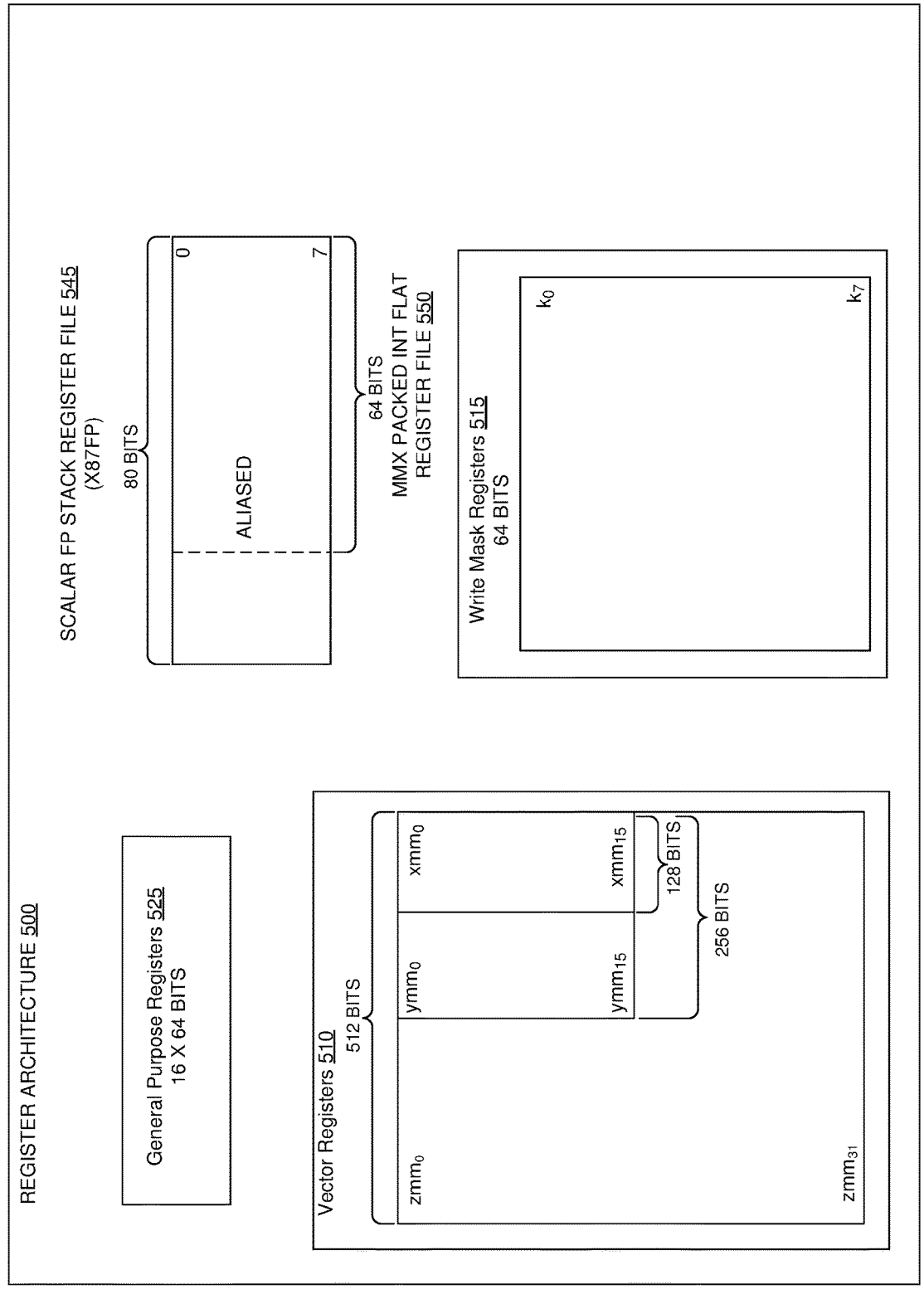
FIG. 5 is a block diagram of a register architecture according to one embodiment.

FIG. 5 is a block diagram of a register architecture 500 according to one embodiment. In the embodiment illustrated, there are 32 vector registers 510 that are 512 bits wide; these registers are referenced as ZMM0 through ZMM31. The lower order 256 bits of the lower 16 ZMM registers are overlaid on registers YMM0-16. The lower order 128 bits of the lower 16 ZMM registers (the lower order 128 bits of the YMM registers) are overlaid on registers XMM0-15. In other words, the vector length field 459B selects between a maximum length and one or more other shorter lengths, where each such shorter length is half the length of the preceding length; and instructions templates without the vector length field 459B operate on the maximum vector length. Further, in one embodiment, the class B instruction templates of the instruction format 400 operate on packed or scalar single/double-precision floating point data and packed or scalar integer data. Scalar operations are operations performed on the lowest order data element position in a ZMM/YMM/XMM register; the higher order data element positions are either left the same as they were prior to the instruction or zeroed depending on the embodiment.

Writemask registers 515—in the embodiment illustrated, there are 8 writemask registers (k0 through k7), each 64 bits in size. In an alternate embodiment, the writemask registers 515 are 16 bits in size. In some embodiments, the vector mask register k0 cannot be used as a writemask; when the encoding that would normally indicate k0 is used for a writemask, it selects a hardwired writemask of 0xFFFF, effectively disabling writemasking for that instruction.

General-purpose registers 525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 545, on which is aliased the MMX packed integer flat register file 550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU (Central Processing Unit) including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

Figures 6A, 6B:
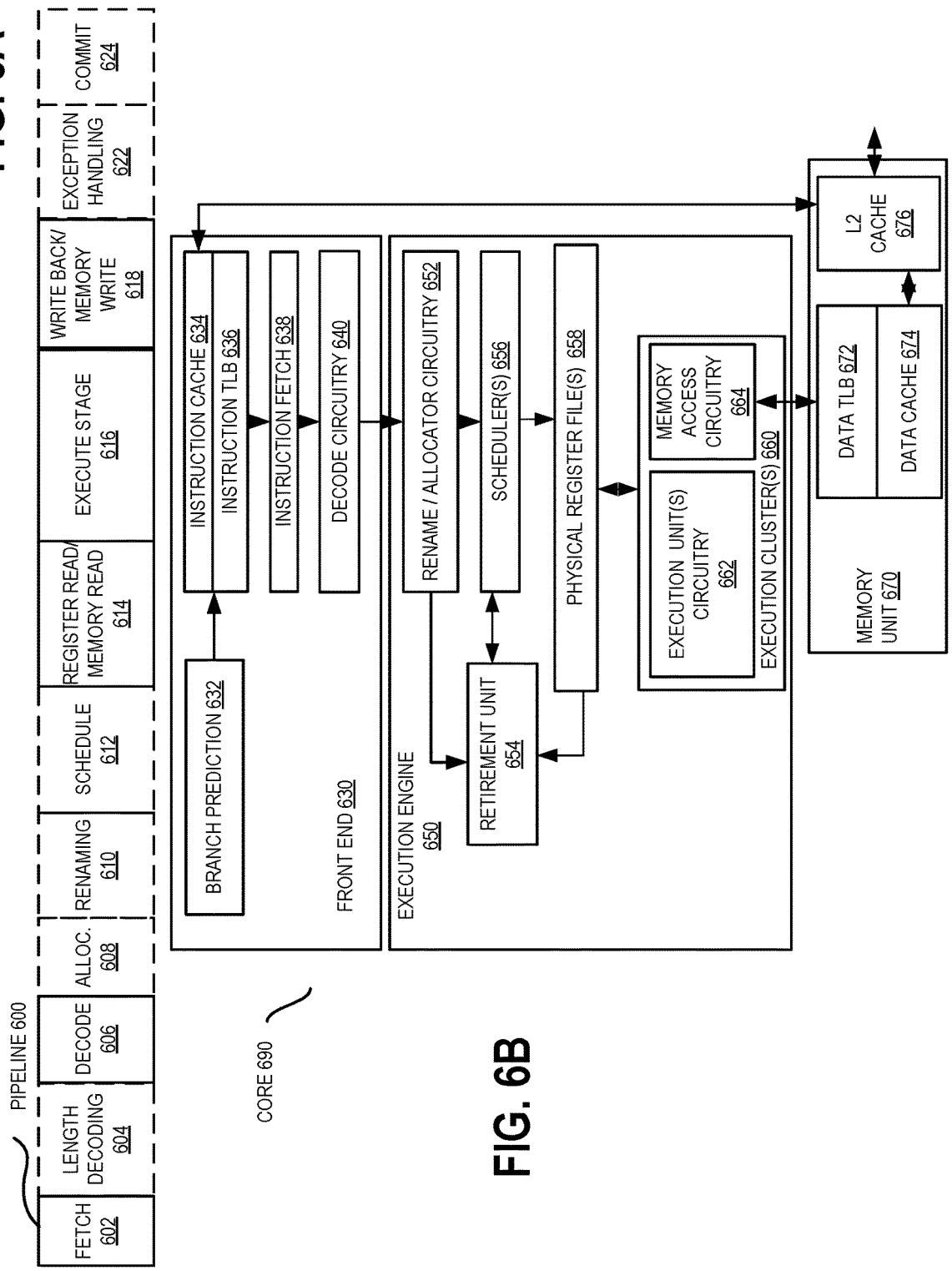
FIG. 6A is a block diagram illustrating both an exemplary in-order pipeline and an exemplary register renaming, out-of-order issue/execution pipeline according to embodiments.
FIG. 6B is a block diagram illustrating both an exemplary embodiment of an in-order architecture core and an exemplary register renaming, out-of-order issue/execution architecture core to be included in a processor according to embodiments.

FIG. 6A is a block diagram illustrating both an exemplary in-order pipeline and an exemplary register renaming, out-of-order issue/execution pipeline according to embodiments. FIG. 6B is a block diagram illustrating both an exemplary embodiment of an in-order architecture core and an exemplary register renaming, out-of-order issue/execution architecture core to be included in a processor according to embodiments. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end unit 630 coupled to an execution engine unit 650, and both are coupled to a memory unit 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode unit 640 or otherwise within the front end unit 630). The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point status (e.g., an instruction pointer that is the address of the next instruction to be executed), etc. In one embodiment, the physical register file(s) unit 658 comprises a vector registers unit, a writemask registers unit, and a scalar registers unit. These register units may provide architectural vector registers, vector mask registers, and general purpose registers. The physical register file(s) unit(s) 658 is overlapped by the retirement unit 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The instruction cache unit 634 is further coupled to a level 2 (L2) cache unit 676 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 690 includes logic to support a packed data instruction set extension (e.g., AVX1, AVX2), thereby allowing the operations used by many multimedia applications to be performed using packed data.

Figure 7:
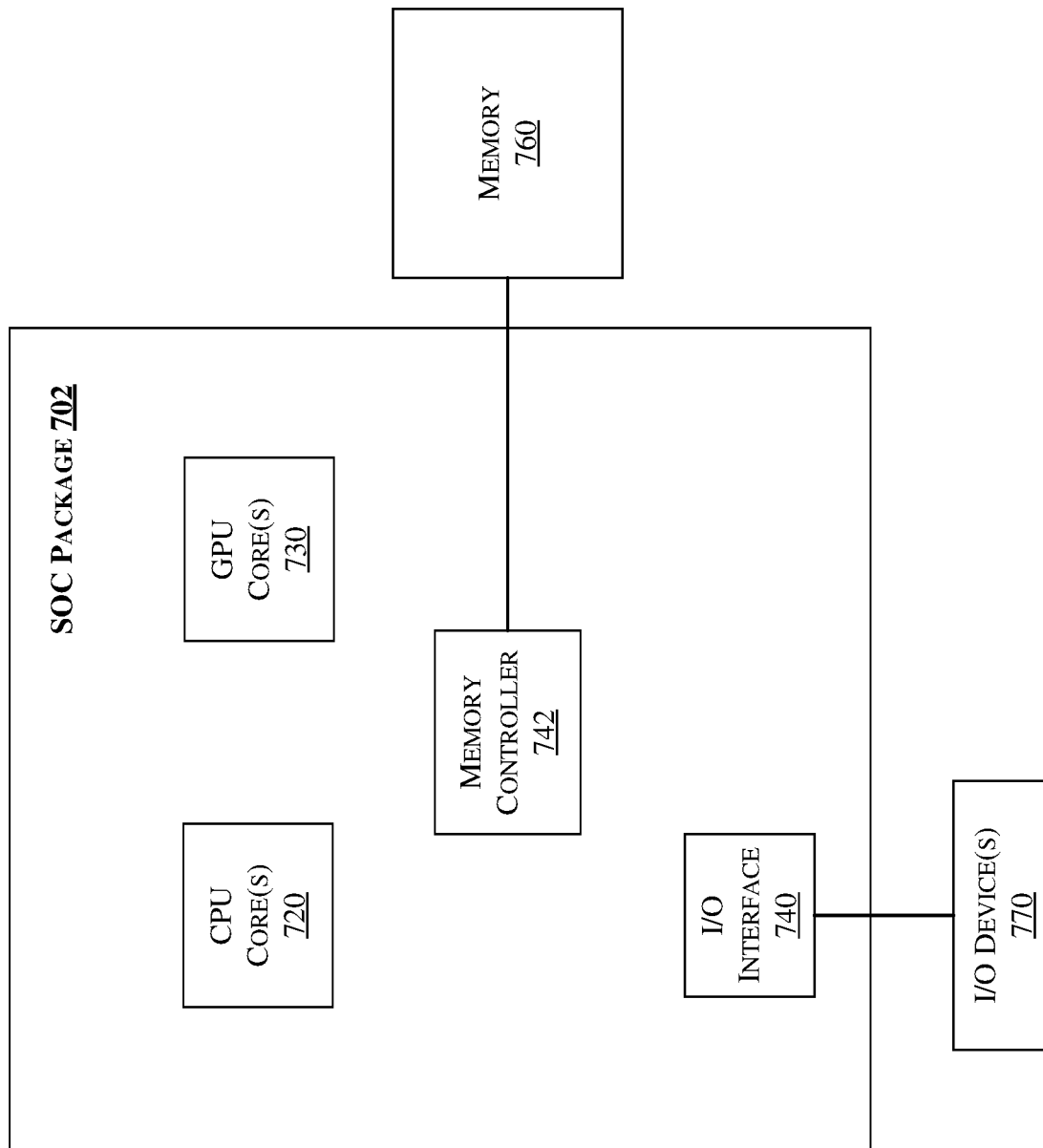
FIG. 7 illustrates a block diagram of an SOC (System On Chip) package in accordance with an embodiment.

FIG. 7 illustrates a block diagram of an SOC package in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 702 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of a keyboard, a mouse, a touchpad, a display, an image/video capture device (such as a camera or camcorder/video recorder), a touch screen, a speaker, or the like.

Figure 8:
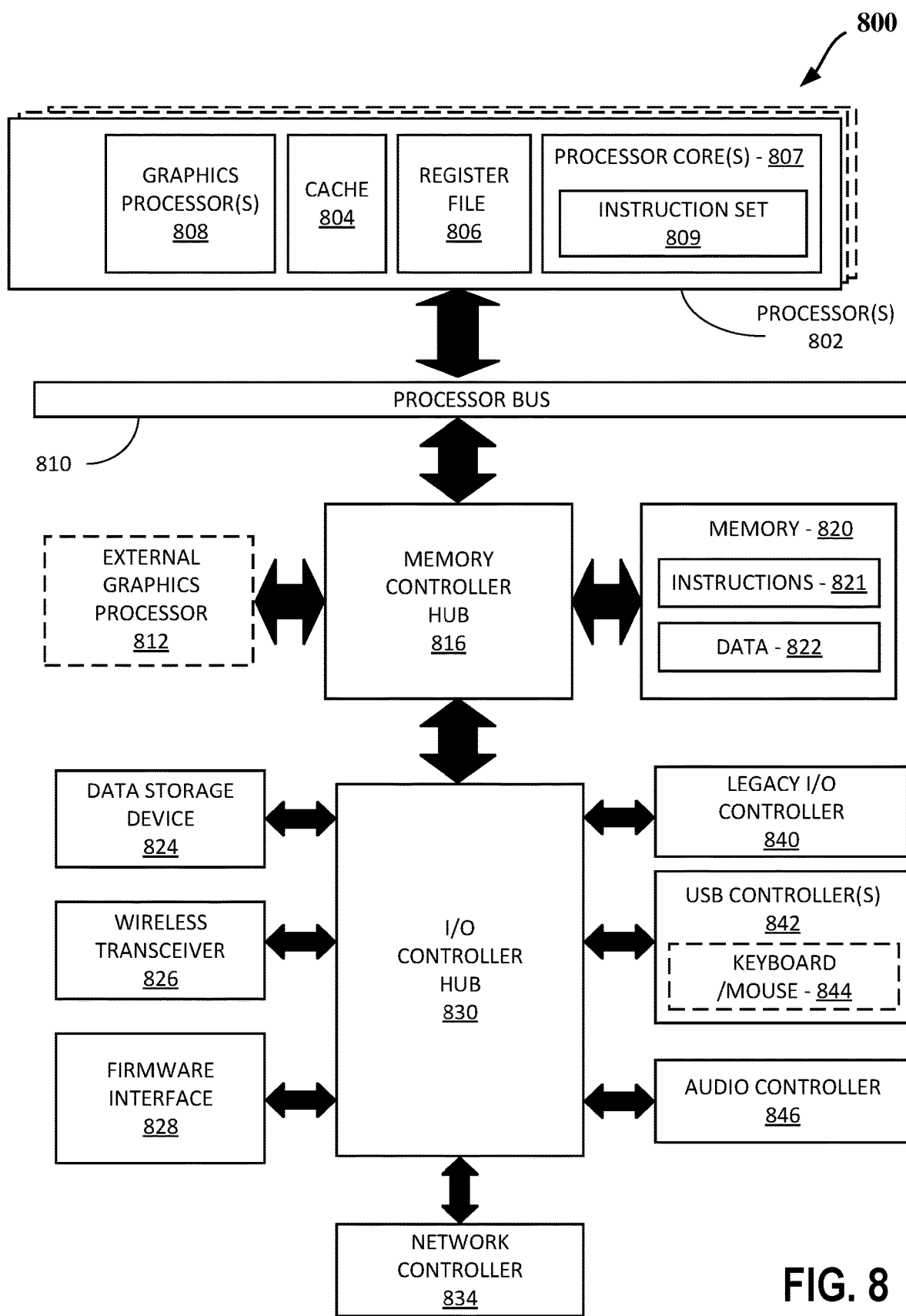
FIG. 8 is a block diagram of a processing system, according to an embodiment.

FIG. 8 is a block diagram of a processing system 800, according to an embodiment. In various embodiments the system 800 includes one or more processors 802 and one or more graphics processors 808, and may be a single processor desktop system, a multiprocessor workstation system, or a server system having a large number of processors 802 or processor cores 807. In on embodiment, the system 800 is a processing platform incorporated within a system-on-a-chip (SoC or SOC) integrated circuit for use in mobile, handheld, or embedded devices.

An embodiment of system 800 can include, or be incorporated within a server-based gaming platform, a game console, including a game and media console, a mobile gaming console, a handheld game console, or an online game console. In some embodiments system 800 is a mobile phone, smart phone, tablet computing device or mobile Internet device. Data processing system 800 can also include, couple with, or be integrated within a wearable device, such as a smart watch wearable device, smart eyewear device, augmented reality device, or virtual reality device. In some embodiments, data processing system 800 is a television or set top box device having one or more processors 802 and a graphical interface generated by one or more graphics processors 808.

In some embodiments, the one or more processors 802 each include one or more processor cores 807 to process instructions which, when executed, perform operations for system and user software. In some embodiments, each of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW). Multiple processor cores 807 may each process a different instruction set 809, which may include instructions to facilitate the emulation of other instruction sets. Processor core 807 may also include other processing devices, such a Digital Signal Processor (DSP).

In some embodiments, the processor 802 includes cache memory 804. Depending on the architecture, the processor 802 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 is additionally included in processor 802 which may include different types of registers for storing different types of data (e.g., integer registers, floating point registers, status registers, and an instruction pointer register). Some registers may be general-purpose registers, while other registers may be specific to the design of the processor 802.

In some embodiments, processor 802 is coupled to a processor bus 810 to transmit communication signals such as address, data, or control signals between processor 802 and other components in system 800. In one embodiment the system 800 uses an exemplary 'hub' system architecture, including a memory controller hub 816 and an Input Output (I/O) controller hub 830. A memory controller hub 816 facilitates communication between a memory device and other components of system 800, while an I/O Controller Hub (ICH) 830 provides connections to I/O devices via a local I/O bus. In one embodiment, the logic of the memory controller hub 816 is integrated within the processor.

Memory device 820 can be a dynamic random access memory (DRAM) device, a static random access memory (SRAM) device, flash memory device, phase-change memory device, or some other memory device having suitable performance to serve as process memory. In one embodiment the memory device 820 can operate as system memory for the system 800, to store data 822 and instructions 821 for use when the one or more processors 802 executes an application or process. Memory controller hub 816 also couples with an optional external graphics processor 812, which may communicate with the one or more graphics processors 808 in processors 802 to perform graphics and media operations.

In some embodiments, ICH 830 enables peripherals to connect to memory device 820 and processor 802 via a high-speed I/O bus. The I/O peripherals include, but are not limited to, an audio controller 846, a firmware interface 828, a wireless transceiver 826 (e.g., Wi-Fi, Bluetooth), a data storage device 824 (e.g., hard disk drive, flash memory, etc.), and a legacy I/O controller 840 for coupling legacy (e.g., Personal System 2 (PS/2)) devices to the system. One or more Universal Serial Bus (USB) controllers 842 connect input devices, such as keyboard and mouse 844 combinations. A network controller 834 may also couple to ICH 830. In some embodiments, a high-performance network controller (not shown) couples to processor bus 810. It will be appreciated that the system 800 shown is exemplary and not limiting, as other types of data processing systems that are differently configured may also be used. For example, the I/O controller hub 830 may be integrated within the one or more processor 802, or the memory controller hub 816 and I/O controller hub 830 may be integrated into a discreet external graphics processor, such as the external graphics processor 812.

Figure 9:
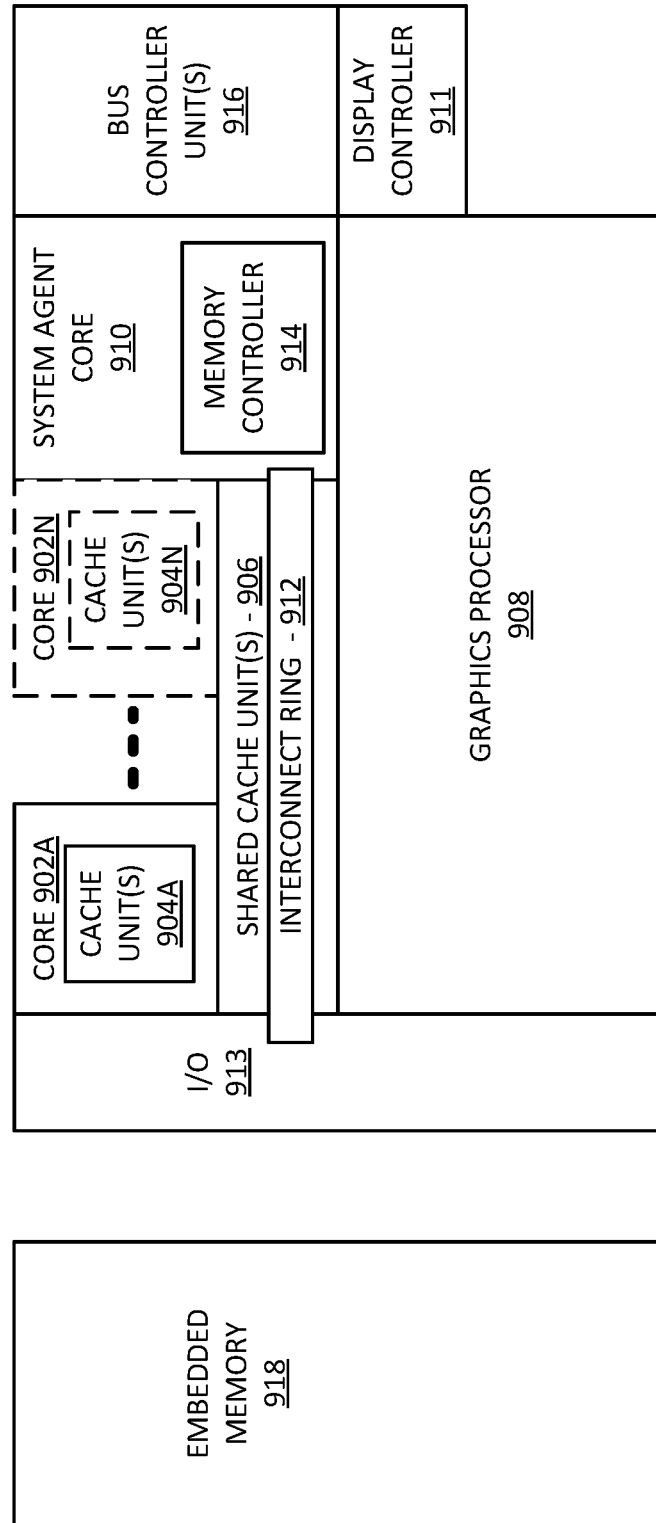
FIG. 9 is a block diagram of an embodiment of a processor having one or more processor cores, according to some embodiments.

FIG. 9 is a block diagram of an embodiment of a processor 900 having one or more processor cores 902A to 902N, an integrated memory controller 914, and an integrated graphics processor 908. Those elements of FIG. 9 having the same reference numbers (or names) as the elements of any other figure herein can operate or function in any manner similar to that described elsewhere herein, but are not limited to such. Processor 900 can include additional cores up to and including additional core 902N represented by the dashed lined boxes. Each of processor cores 902A to 902N includes one or more internal cache units 904A to 904N. In some embodiments each processor core also has access to one or more shared cached units 906.

The internal cache units 904A to 904N and shared cache units 906 represent a cache memory hierarchy within the processor 900. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 906 and 904A to 904N.

In some embodiments, processor 900 may also include a set of one or more bus controller units 916 and a system agent core 910. The one or more bus controller units 916 manage a set of peripheral buses, such as one or more Peripheral Component Interconnect buses (e.g., PCI, PCI Express). System agent core 910 provides management functionality for the various processor components. In some embodiments, system agent core 910 includes one or more integrated memory controllers 914 to manage access to various external memory devices (not shown).

In some embodiments, one or more of the processor cores 902A to 902N include support for simultaneous multi-threading. In such embodiment, the system agent core 910 includes components for coordinating and operating cores 902A to 902N during multi-threaded processing. System agent core 910 may additionally include a power control unit (PCU), which includes logic and components to regulate the power state of processor cores 902A to 902N and graphics processor 908.

In some embodiments, processor 900 additionally includes graphics processor 908 to execute graphics processing operations. In some embodiments, the graphics processor 908 couples with the set of shared cache units 906, and the system agent core 910, including the one or more integrated memory controllers 914. In some embodiments, a display controller 911 is coupled with the graphics processor 908 to drive graphics processor output to one or more coupled displays. In some embodiments, display controller 911 may be a separate module coupled with the graphics processor via at least one interconnect, or may be integrated within the graphics processor 908 or system agent core 910.

In some embodiments, a ring based interconnect unit 912 is used to couple the internal components of the processor 900. However, an alternative interconnect unit may be used, such as a point-to-point interconnect, a switched interconnect, or other techniques, including techniques well known in the art. In some embodiments, graphics processor 908 couples with the ring interconnect 912 via an I/O link 913.

The exemplary I/O link 913 represents at least one of multiple varieties of I/O interconnects, including an on package I/O interconnect which facilitates communication between various processor components and a high-performance embedded memory module 918, such as an eDRAM (or embedded DRAM) module. In some embodiments, each of the processor cores 902 to 902N and graphics processor 908 use embedded memory modules 918 as a shared Last Level Cache.

In some embodiments, processor cores 902A to 902N are homogenous cores executing the same instruction set architecture. In another embodiment, processor cores 902A to 902N are heterogeneous in terms of instruction set architecture (ISA), where one or more of processor cores 902A to 902N execute a first instruction set, while at least one of the other cores executes a subset of the first instruction set or a different instruction set. In one embodiment processor cores 902A to 902N are heterogeneous in terms of microarchitecture, where one or more cores having a relatively higher power consumption couple with one or more power cores having a lower power consumption. Additionally, processor 900 can be implemented on one or more chips or as an SoC integrated circuit having the illustrated components, in addition to other components.

Figure 10:
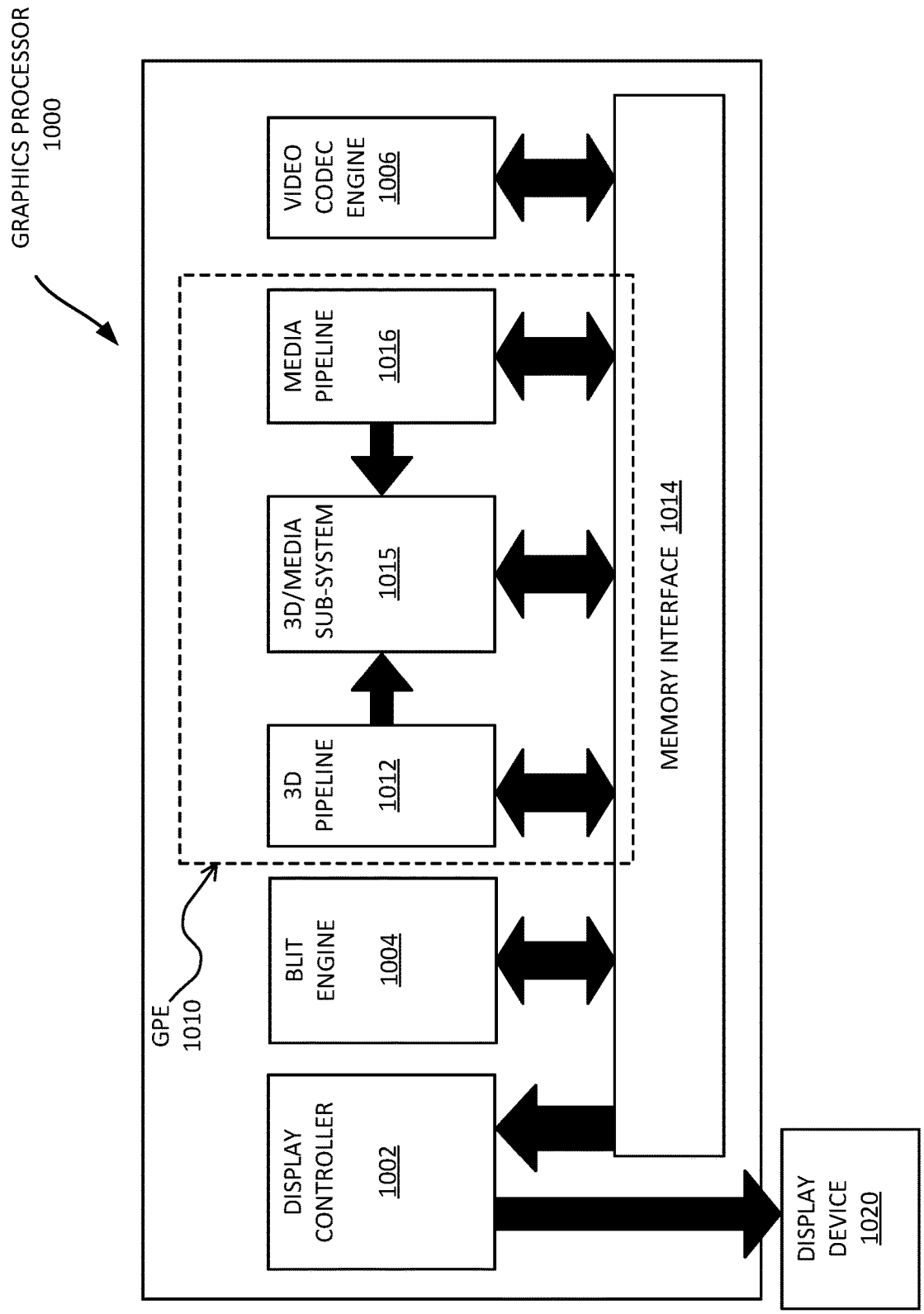
FIG. 10 is a block diagram of a graphics processor, according to an embodiment.

FIG. 10 is a block diagram of a graphics processor 1000, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1000 includes a memory interface 1014 to access memory. Memory interface 1014 can be an interface to local memory, one or more internal caches, one or more shared external caches, and/or to system memory.

In some embodiments, graphics processor 1000 also includes a display controller 1002 to drive display output data to a display device 1020. Display controller 1002 includes hardware for one or more overlay planes for the display and composition of multiple layers of video or user interface elements. In some embodiments, graphics processor 1000 includes a video codec engine 1006 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 321M/VC-1, and Joint Photographic Experts Group (JPEG) formats such as JPEG, and Motion JPEG (MJPEG) formats.

In some embodiments, graphics processor 1000 includes a block image transfer (BLIT) engine 1004 to perform two-dimensional (2D) rasterizer operations including, for example, bit-boundary block transfers. However, in one embodiment, 3D graphics operations are performed using one or more components of graphics processing engine (GPE) 1010. In some embodiments, graphics processing engine 1010 is a compute engine for performing graphics operations, including three-dimensional (3D) graphics operations and media operations.

In some embodiments, GPE 1010 includes a 3D pipeline 1012 for performing 3D operations, such as rendering three-dimensional images and scenes using processing functions that act upon 3D primitive shapes (e.g., rectangle, triangle, etc.). The 3D pipeline 1012 includes programmable and fixed function elements that perform various tasks within the element and/or spawn execution threads to a 3D/Media sub-system 1015. While 3D pipeline 1012 can be used to perform media operations, an embodiment of GPE 1010 also includes a media pipeline 1016 that is specifically used to perform media operations, such as video post-processing and image enhancement.

In some embodiments, media pipeline 1016 includes fixed function or programmable logic units to perform one or more specialized media operations, such as video decode acceleration, video de-interlacing, and video encode acceleration in place of, or on behalf of video codec engine 1006. In some embodiments, media pipeline 1016 additionally includes a thread spawning unit to spawn threads for execution on 3D/Media sub-system 1015. The spawned threads perform computations for the media operations on one or more graphics execution units included in 3D/Media sub-system 1015.

In some embodiments, 3D/Media subsystem 1015 includes logic for executing threads spawned by 3D pipeline 1012 and media pipeline 1016. In one embodiment, the pipelines send thread execution requests to 3D/Media subsystem 1015, which includes thread dispatch logic for arbitrating and dispatching the various requests to available thread execution resources. The execution resources include an array of graphics execution units to process the 3D and media threads. In some embodiments, 3D/Media subsystem 1015 includes one or more internal caches for thread instructions and data. In some embodiments, the subsystem also includes shared memory, including registers and addressable memory, to share data between threads and to store output data.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

The following examples pertain to further embodiments. Example 1 includes an apparatus comprising: memory to store a memory page, the memory page to include a metadata page and a plurality of slots, the metadata page to include information corresponding to the plurality of slots; decode circuitry to decode an instruction, the instruction to include a source operand; and execution circuitry to execute the decoded instruction according to the source operand to load a first tag for a first slot of the plurality of slots in response to a memory access request directed at the first slot of the plurality of slots, wherein the memory access request is allowed to proceed in response to a match between the first tag and a second tag of a pointer of the memory access request, wherein the memory page is to store a separate tag in proximity to each of the plurality of slots. Example 2 includes the apparatus of example 1, wherein the separate tag in proximity to each of the plurality of slots is located at a start of each slot, at an end of each slot, or within an offset from the start or end of each slot. Example 3 includes the apparatus of example 1, wherein the information for the plurality of slots comprises one or more of a slot size and an offset for a first slot of the plurality of slots in the memory page. Example 4 includes the apparatus of example 1, wherein the memory page comprises one or more guard pages to provide isolation between different regions of the memory page. Example 5 includes the apparatus of example 1, wherein the execution circuitry to compute lower and upper boundaries for an allocation corresponding to the memory access request. Example 6 includes the apparatus of example 5, wherein the execution circuitry is to determine whether the pointer is within spatial bounds for the allocation. Example 7 includes the apparatus of example 1, wherein the memory page comprises one or more regions, wherein each slot of the plurality of slots in a first region of the one or more regions is to have a same size. Example 8 includes the apparatus of example 7, wherein the memory is to store a page table having a plurality of entries, wherein a bit in at least one of the plurality of entries of the page table is to indicate an existence of the first region. Example 9 includes the apparatus of example 7, wherein one or more range registers correspond to the one or more regions.

Example 10 includes the apparatus of example 7, wherein a bit in a linearly mapped data structure is to define user-controlled page attributes corresponding to the one or more regions. Example 11 includes the apparatus of example 10, wherein the bit is referenced by a register. Example 12 includes the apparatus of example 7, wherein a bit in the pointer is to indicate existence of the first region. Example 13 includes the apparatus of example 1, wherein the decode circuitry is to decode a second instruction, the second instruction to include a first operand, wherein the execution circuitry is to execute the decoded second instruction according to the first operand to modify the first tag. Example 14 includes the apparatus of example 1, wherein the decode circuitry is to decode a second instruction, the second instruction to include a first operand, wherein the execution circuitry is to execute the second instruction according to the first operand to determine a slot corresponding to the pointer of the memory access request. Example 15 includes the apparatus of example 1, wherein the memory is to store a multi-page complex including a plurality of memory pages, each of the plurality of memory pages to include the metadata page and the plurality of slots.

Example 16 includes an apparatus comprising: memory to store a memory page, the memory page to include a metadata page and a plurality of slots, the metadata page to include information corresponding to the plurality of slots; decode circuitry to decode an instruction, the instruction to include a first operand; and execution circuitry to execute the decoded instruction according to the first operand to update a bit corresponding to the memory page in a page table, wherein the bit is to indicate an existence of the plurality of slots. Example 17 includes the apparatus of example 16, wherein the execution circuitry is disallowed from modifying any other bit in the page table corresponding to other memory pages. Example 18 includes the apparatus of example 16, wherein the execution circuitry is to update of a plurality of bits in the page table to enforce a user-controlled security policy. Example 19 includes the apparatus of example 16, wherein the execution circuitry is to update one or more bits of an entry in the page table to: modify an eXecute Disable (XD) field, a Read/Write (R/W) field, and/or a Protection Key (PKEY) field to enforce a user-controlled security policy. Example 20 includes the apparatus of example 19, wherein the execution circuitry is to enforce Write XOR Execute (WAX) policy for Just In Time (JIT) code by setting the XD bit and/or the R/W bit. Example 21 includes the apparatus of example 16, wherein the decode circuitry is to decode a second instruction, the second instruction to include at least one operand, wherein the execution circuitry is to execute the decoded second instruction according to the at least one operand to clear one or more stale entries in one or more caches in response to an update to the bit.

Example 22 includes one or more computer-readable medium comprising one or more instructions that when executed on at least one processor configure the at least one processor to perform one or more operations to: store a memory page in memory, the memory page to include a metadata page and a plurality of slots, the metadata page to include information corresponding to the plurality of slots; decode an instruction, the instruction to include a source operand; and execute the decoded instruction according to the source operand to load a first tag for a first slot of the plurality of slots in response to a memory access request directed at the first slot of the plurality of slots, wherein the memory access request is allowed to proceed in response to a match between the first tag and a second tag of a pointer of the memory access request, wherein the memory page is to store a separate tag in proximity to each of the plurality of slots. Example 23 includes the one or more computer-readable medium of example 22, further comprising one or more instructions that when executed on the at least one processor configure the at least one processor to perform one or more operations to cause the separate tag in proximity to each of the plurality of slots to be located at a start of each slot, at an end of each slot, or within an offset from the start or end of each slot. Example 24 includes the one or more computer-readable medium of example 22, wherein the information for the plurality of slots includes one or more of a slot size and an offset for a first slot of the plurality of slots in the memory page.

Example 25 includes an apparatus comprising means to perform a method as set forth in any preceding example.

Example 26 includes machine-readable storage including machine-readable instructions, when executed, to implement a method or realize an apparatus as set forth in any preceding example.

In various embodiments, one or more operations discussed with reference to FIG. 1 et seq. may be performed by one or more components (interchangeably referred to herein as "logic") discussed with reference to any of the figures.

In various embodiments, the operations discussed herein, e.g., with reference to FIG. 1 et seq., may be implemented as hardware (e.g., logic circuitry), software, firmware, or combinations thereof, which may be provided as a computer program product, e.g., including one or more tangible (e.g., non-transitory) machine-readable or computer-readable media having stored thereon instructions (or software procedures) used to program a computer to perform a process discussed herein. The machine-readable medium may include a storage device such as those discussed with respect to the figures.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   decode circuitry to decode an instruction, the instruction to include a source operand; and
   execution circuitry to execute the decoded instruction according to the source operand to load a first tag for a first slot of a plurality of slots of a memory page of memory in response to a memory access request directed at the first slot of the plurality of slots, wherein the memory access request is allowed to proceed in response to a match between the first tag and a second tag of a pointer of the memory access request, wherein each of the plurality of slots is to store a separate tag.

2. The apparatus of claim 1, wherein the separate tag is to be located at a start of each slot, at an end of each slot, or within an offset from the start or end of each slot.

3. The apparatus of claim 1, wherein information for the plurality of slots comprises one or more of a slot size and an offset for a first slot of the plurality of slots in the memory page.

4. The apparatus of claim 1, wherein the memory page comprises one or more guard pages to provide isolation between different regions of the memory page.

5. The apparatus of claim 1, wherein the execution circuitry is to compute lower and upper boundaries for an allocation corresponding to the memory access request.

6. The apparatus of claim 5, wherein the execution circuitry is to determine whether the pointer is within spatial bounds for the allocation.

7. The apparatus of claim 1, wherein the memory page comprises one or more regions, wherein each slot of the plurality of slots in a first region of the one or more regions is to have a same size.

8. The apparatus of claim 7, wherein the memory is to store a page table having a plurality of entries, wherein a bit in at least one of the plurality of entries of the page table is to indicate an existence of the first region.

9. The apparatus of claim 7, wherein one or more range registers correspond to the one or more regions.

10. The apparatus of claim 7, wherein a bit in a linearly mapped data structure is to define user-controlled page attributes corresponding to the one or more regions.

11. The apparatus of claim 10, wherein the bit is referenced by a register.

12. The apparatus of claim 7, wherein a bit in the pointer is to indicate existence of the first region.

13. The apparatus of claim 1, wherein the decode circuitry is to decode a second instruction, the second instruction to include an opcode, a first operand, and a second operand, wherein the execution circuitry is to execute the decoded second instruction according to the opcode to modify the first tag at an address provided by the first operand to be a value stored by the second operand.

14. The apparatus of claim 1, wherein the decode circuitry is to decode a second instruction, the second instruction to include an opcode, and a first operand, wherein the execution circuitry is to execute the second instruction according to the opcode to determine a slot corresponding to a pointer of a memory access request pointed to be the first operand.

15. The apparatus of claim 1, wherein a memory is to store a multi-page complex including a plurality of memory pages, each of the plurality of memory pages to include a metadata page and the plurality of slots.

16. An apparatus comprising:
   memory to store a memory page, the memory page to include a metadata page and a plurality of slots, the metadata page to include information corresponding to the plurality of slots;
   decode circuitry to decode an instruction, the instruction to include a first operand; and
   execution circuitry to execute the decoded instruction according to the first operand to update a bit corresponding to the memory page in a page table, wherein the bit is to indicate an existence of the plurality of slots.

17. The apparatus of claim 16, wherein the execution circuitry is disallowed from modifying any other bit in the page table corresponding to other memory pages.

18. The apparatus of claim 16, wherein the execution circuitry is to update a plurality of bits in the page table to enforce a security policy, wherein the security policy is to be controllable by a user.

19. The apparatus of claim 16, wherein the execution circuitry is to update one or more bits of an entry in the page table to: modify an execute Disable (XD) field, a Read/Write (R/W) field, and/or a Protection Key (PKEY) field to enforce a security policy, wherein the security policy is to be controllable by a user.

20. The apparatus of claim 19, wherein the execution circuitry is to enforce Write XOR Execute (WAX) policy for Just In Time (JIT) code by setting the XD bit and/or the R/W bit.

21. One or more computer-readable medium comprising one or more instructions that when executed on at least one processor configure the at least one processor to perform one or more operations to:
  store a memory page in a memory, the memory page to include a metadata page and a plurality of slots, the metadata page to include information corresponding to the plurality of slots;
  decode an instruction, the instruction to include a source operand; and
  execute the decoded instruction according to the source operand to load a first tag for a first slot of the plurality of slots in response to a memory access request directed at the first slot of the plurality of slots, wherein the memory access request is allowed to proceed in response to a match between the first tag and a second tag of a pointer of the memory access request, wherein each of the plurality of slots is to store a separate tag.

22. The one or more computer-readable medium of claim 21, further comprising one or more instructions that when executed on the at least one processor configure the at least one processor to perform one or more operations to cause the separate tag to be located at a start of each slot, at an end of each slot, or within an offset from the start or end of each slot.

23. The one or more computer-readable medium of claim 21, wherein the information for the plurality of slots includes one or more of a slot size and an offset for a first slot of the plurality of slots in the memory page.

\* \* \* \* \*